US012664853B2

(12) United States Patent
Cook et al.

(10) Patent No.: US 12,664,853 B2
(45) Date of Patent: Jun. 23, 2026

(54) VIRTUAL ATTENDANT GAME MACHINE

(71) Applicant: Bob's Space Racers, Inc., Holly Hill, FL (US)

(72) Inventors: Jack Cook, Ormond Beach, FL (US); Joshua Peacock, Holly Hill, FL (US)

(73) Assignee: Bob's Space Racers, Inc., Holly Hill, FL (US)

(*) Notice: Subject to any disclaimer, the term of this patent is extended or adjusted under 35 U.S.C. 154(b) by 277 days.

(21) Appl. No.: 18/389,217

(22) Filed: Nov. 13, 2023

(65) Prior Publication Data

US 2024/0185666 A1 Jun. 6, 2024

Related U.S. Application Data

(63) Continuation-in-part of application No. 18/105,952, filed on Feb. 6, 2023, now Pat. No. 12,525,091, which is a continuation-in-part of application No. 17/988,506, filed on Nov. 16, 2022.

(60) Provisional application No. 63/280,108, filed on Nov. 16, 2021.

(51) Int. Cl.
*G07F 17/32* (2006.01)
*A63F 7/06* (2006.01)

(52) U.S. Cl.
CPC ............ *G07F 17/3206* (2013.01); *A63F 7/06* (2013.01)

(58) Field of Classification Search
None
See application file for complete search history.

(56) References Cited

U.S. PATENT DOCUMENTS

| | | | |
|---|---|---|---|
| 2,617,653 A | 11/1952 | Keller | |
| 3,362,712 A | 1/1968 | Wagner | |
| 4,013,292 A | 3/1977 | Cohen et al. | |
| 4,949,972 A | 8/1990 | Goodwin et al. | |
| 5,230,505 A | 7/1993 | Paquet et al. | |
| 5,553,859 A | 9/1996 | Kelly et al. | |
| 5,649,706 A | 7/1997 | Treat, Jr. et al. | |
| 5,658,211 A | 8/1997 | Glover | |
| 11,688,236 B2 | 6/2023 | Thoeni et al. | |
| 2022/0141550 A1* | 5/2022 | Liu | H04N 21/47202 600/38 |
| 2022/0296460 A1* | 9/2022 | Liu | A63F 13/792 |
| 2023/0039469 A1* | 2/2023 | Liu | H04N 21/43079 |
| 2023/0112195 A1 | 4/2023 | Davis | |
| 2024/0185666 A1 | 6/2024 | Cook et al. | |

OTHER PUBLICATIONS

Up for Auction: Collection of Carnival Knockdown Dolls, published Apr. 10, 2012 and available online at http://amusingthezillion.com/tag/knockdown-dolls/ (Year: 2012).

* cited by examiner

*Primary Examiner* — Ronald Laneau
(74) *Attorney, Agent, or Firm* — Standley Law Group LLP; Jeffrey S. Standley; Kenny W. Pung

(57) ABSTRACT

An attendant-free midway-style electronic game machine. The game machine may be configured to detect when a projectile has been actuated towards the target. An electronic controller in electronic communication with said detector, may be configured to automatically end a game play session once a predetermined number of said game projectiles have been detected as having been actuated by a user toward said target. And, a virtual attendant display is provided, in electronic communication with a game controller, to greet and instruct and interact with players in playing the game.

10 Claims, 28 Drawing Sheets

VIRTUAL ATTENDANT GAME MACHINE

CROSS-REFERENCE TO RELATED APPLICATIONS

This application is a continuation-in-part of U.S. patent application Ser. No. 18/105,952, which is a continuation-in-part of U.S. patent application Ser. No. 17/988,506, filed Nov. 16, 2022, which makes a priority claim to U.S. Provisional Application No. 63/280,108, filed Nov. 16, 2021. The disclosures of U.S. patent application Ser. No. 17/988,506 and U.S. Provisional Application No. 63/280,108 are hereby incorporated by reference as if fully restated herein.

FIELD

The application relates to electronic game machines and, more particularly, to midway-style electronic game machines in association with a virtual attendant.

BACKGROUND

Amusement parks, theme parks, carnivals, family entertainment centers, festivals, fairs (e.g., county or state fairs), and the like often feature one or more areas with clusters of carnival games, amusement rides, and other similar types of entertainment attractions. These areas are commonly known as a "midway."

One popular type of carnival game that is often played in midways is the game of skill that involves having players test their aim at hitting a target by launching, shooting, or throwing some sort of projectile like a ball, dart, or weapon. Some games of this type are the "Cross Bow Shoot", the "Milk Bottle" game, or the "Balloon and Dart" game. Basketball shooting games can also be considered in this genre as well. Collectively, these types of games can be considered "midway-style games."

Midway-style games generally require an attendant to administer and oversee the game. Among other things, the attendant can receive payment from players, keep score, and distribute prizes. Crucially, attendants can also prevent players from cheating by keeping track of the number of authorized attempts a player has taken and denying any unauthorized attempts. Players of midway-style games generally pay for a limited number of attempts or a limited timeframe to make as many attempts as possible.

For commercial enterprises that wish to offer such a gaming area, the cost of hiring people as attendants can be steep or perhaps even prohibitive. Moreover, human laborers can also be unreliable both in terms of availability (e.g., illness, labor shortages, etc.) and fidelity to desired standards (e.g., friendliness, cleanliness, etc.).

Those skilled in the art will appreciate, however, that the need for an attendant can be a major drawback to the commercialization of midway-style games. To hire an attendant is to incur labor costs, and that's only if staffing is reliable. Therefore, what is needed is a way to play midway-style games without an attendant. The present disclosure relates to a midway-style electronic game machine capable of doing so.

Accordingly, those skilled in the art continue with research and development efforts in the field of attendant-free game machines.

SUMMARY OF THE INVENTION

Disclosed are game machines that include game projectiles, one or more structural portions that may define a lower cabinet and a target cabinet, a controller, at least one detector, and an electronic display with automated instructions for players.

In one embodiment, the game machine includes a lower cabinet that includes a counter section and an elongated ramp section, with the ramp section extending backwards relative to the counter section. The game machine also includes a target cabinet located on top of the ramp section and spaced a distance from the counter section. The game machine further includes at least one sensor array configured to detect interruptions in a detection area located between the counter section and the target cabinet. An electronic display may be placed on or near the game machine, to instruct players on various aspects of playing the game, and may be in electronic communication with the certain functions of the game machine. The display may be a touch screen display to enable the player to interact with the display and the game.

In another embodiment, the game machine includes a lower cabinet that includes a counter section and an elongated ramp section, with the ramp section extending backwards relative to the counter section. The game machine also includes a target cabinet located on top of the ramp section and spaced a distance from the counter section. The game machine further includes a first sensor array configured to detect when an interruption occurs in a first detection area located between the counter section and the target cabinet. The game machine yet further includes a second sensor array configured to detect when an interruption occurs in a second detection area located between the first detection plane and the target cabinet. An electronic display in association with the game machine may be provided to interact with a player, to provide audio/video instructions to a player about features and use of the game, and to electronically recognize when a prospective player is near the game machine to beckon a prospective player to play the game.

In yet another embodiment, the game machine includes a lower cabinet that includes a counter section and an elongated ramp section, with the ramp section extending backwards relative to the counter section. The game machine also includes a target cabinet located on top of the ramp section and spaced a distance from the counter section. The target cabinet includes a forward-facing side, a target disposed on the forward-facing side, and a made-shot sensor operatively connected to the target for detecting when a player has made a successful attempt. The game machine further includes at least one sensor array configured to detect interruptions in a detection area located between the counter section and the target cabinet. An electronic display may be placed on or near the game machine to assist players in various ways to play the game. The display may include audio and/or video instructions to a player. The display may be electronically connected to the game machine to provide timely instructions to players at such times as before the game begins play, during game play, and at the conclusion of game play. Such a display may eliminate the need for a live attendant to assist game play. The display may further be synchronized to game play and game progress to provide timely instructions and assistance to players. The display may be in electronic communication with a game payment receiving device (e.g., cash, tokens, payment card, other) and may be programmed to change its instructions or to progress with instructions to a player once payment has been made by a player. The display may also be programmed with instructions to a player when the game is over, which may award/dispense (directly or indirectly) and/or explain or prompt game rewards (e.g., tickets which may be exchanged for prizes, coupons, points, added free plays, added value to a player card, other).

Other examples of the disclosed game machine will become apparent from the following detailed description, the accompanying drawings, and the appended claims.

DETAILED DESCRIPTION

Figure 1:
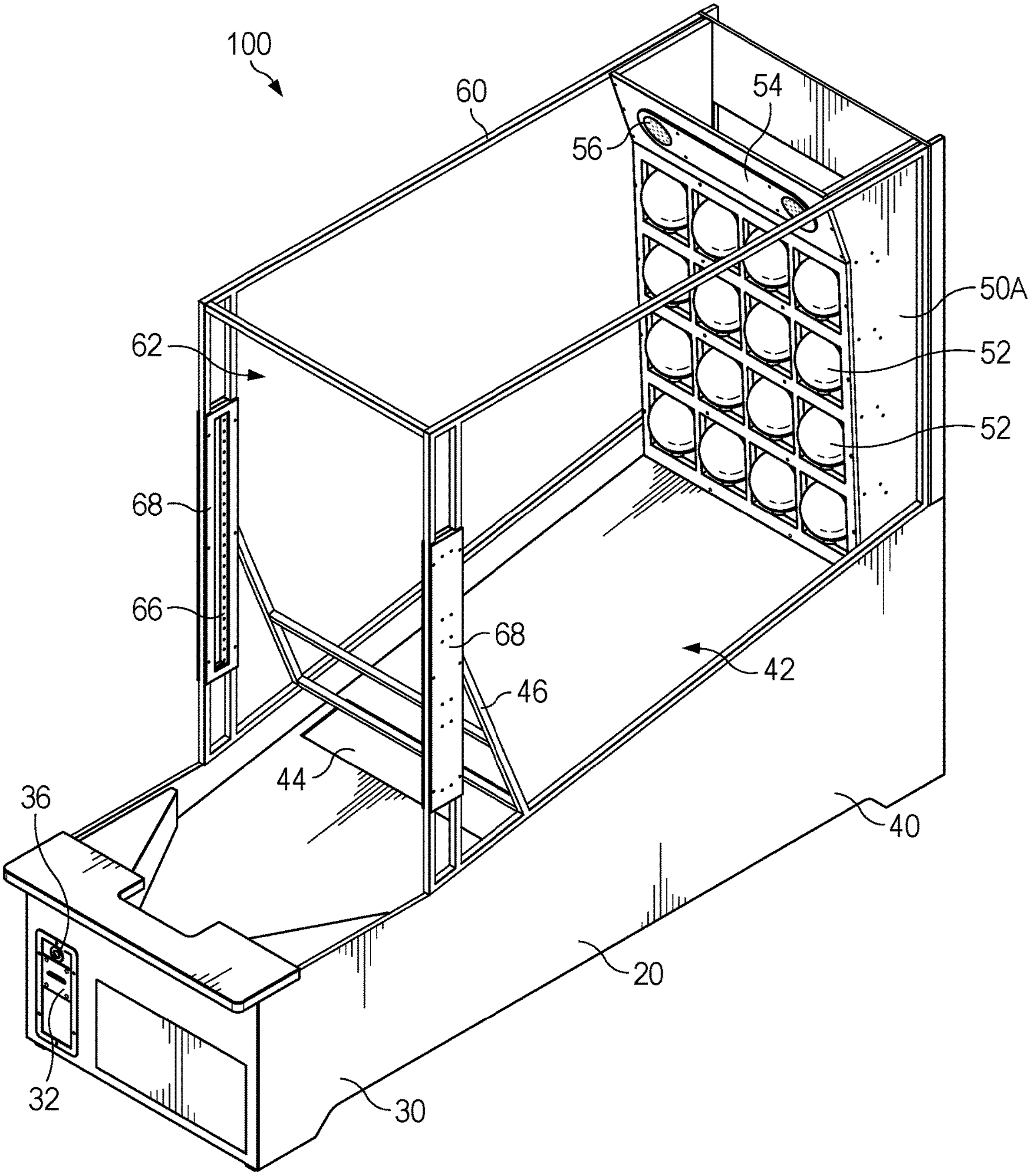
FIG. 1 is a front perspective view of a first exemplary embodiment of a midway-style electronic game machine.

The following detailed description refers to the accompanying drawings, which illustrate specific examples described by the disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic and/or operational step described in connection with the example is included in at least one embodiment and/or implementation of the subject matter according to the present disclosure. Thus, the phrase "an example" and similar language throughout the present disclosure may, but does not necessarily, refer to the same example. Further, the subject matter characterizing any one example may, but does not necessarily, include the subject matter characterizing any other example.

Referring to FIGS. 1-5, the present disclosure provides an exemplary embodiment of a midway-style electronic game machine 100 (herein, the "game machine"). The game machine 100 includes a first structural portion or lower cabinet 20, a second structural portion or target cabinet (referred to generally with ref. no. 50 but shown in the Figures as 50A-D), and preferably also includes a frame 60. The lower cabinet 20 may include forward counter section 30 and a rear ramp section 40. The ramp section may be elongated, extending relative to the counter section 30, and may define an upward slope from front to rear. The target cabinet 50 is located towards the rear of the lower cabinet 20, which in some embodiments may be the highest point along the ramp section 40. The frame 60 is located above the lower cabinet 20 and defines a passing lane 62 between the counter section 30 and the target cabinet 50 (best shown in FIG. 4). Players can position themselves in a user play position in front of the counter section 30 and attempt to hit a target (referred to generally with ref. no. 52 but shown in the Figures as 52A-D) included on or defined in the target cabinet 50 by throwing, shooting, or otherwise launching/actuating game projectiles through the passing lane 62. After hitting the target cabinet 50, the projectiles can then fall onto the ramp section 40 and roll down to the counter section 30 back to the player.

As used herein, the term "projectile" refers to any object that is put in motion through space, including objects that are rolled along a surface (e.g., bowling balls and the balls used to play skee-ball).

In exemplary embodiments, the game machine 100 may define a gather area 42 on the ramp section 40 where projectiles can gather after a player has launched or thrown them through the passing lane 62. The gather area 42 may include a gate 44 that obstructs the flow of projectiles down the ramp section 40, thereby preventing them from reaching the counter section 30. The gate 44 may extend across the width of the ramp section 40. The gate 44 may be configured to pivot upwards to stop projectiles from traveling down the ramp section 40 (e.g., after a certain number of authorized attempts has been made or after a certain amount of time has elapsed), and may pivot downwards until it is flush with the top surface of the ramp section 40 to permit gathered projectiles to travel to the counter section 30. The game machine 100 may also include a guard 46 positioned above the gate 44 to prevent players from reaching in and taking projectiles out of the gather area 42.

Those skilled in the art will appreciate that although the gate 44 shown in FIGS. 1-5 is considered exemplary, it is not meant to be limiting. It is contemplated that different types of gates, including gates that are not integrated into the ramp section or gates that do not pivot upwards and downwards may also be utilized. Variations such as these will not result in a departure from the scope of the present disclosure.

In exemplary embodiments, the counter section 30 of the game machine 100 may include a payment device 32 for receiving payment from a player. The payment device 32 may be configured to verify if the correct amount of payment has been presented. The payment device 32 is not limited to any particular type of currency and can be configured to operate with, for example, coins, bills, and/or cards. In a preferred embodiment, the payment mechanism 32 may include a card reader for receiving payment.

In exemplary embodiments, the counter section 30 of the game machine 100 may include a game start device 36. The game start device 36 may comprise a user-actuatable means such as a push button or a touch screen. A player may engage the game start device 36 to begin play of the game machine 100. In example, a player may engage the game start device 36 to cause the gate 44 to pivot downwards and release projectiles. A predetermined number of game projectiles for a game play session may be provided to the user and accessible at a user game play position to begin the game play session.

In exemplary embodiment, the counter section 30 of the game machine 100 may include a reward dispenser for dispensing rewards earned for playing the game machine 100. For example, the reward dispenser may be a ticket dispenser that is configured to dispense tickets that the player can later redeem for prizes. These tickets can be of any size, shape, or variety. It is contemplated that the game machine 100 does not need to be limited to any particular type of reward dispenser, and that different types of reward dispensers may be utilized without departing from the scope of the present disclosure.

Figure 6:
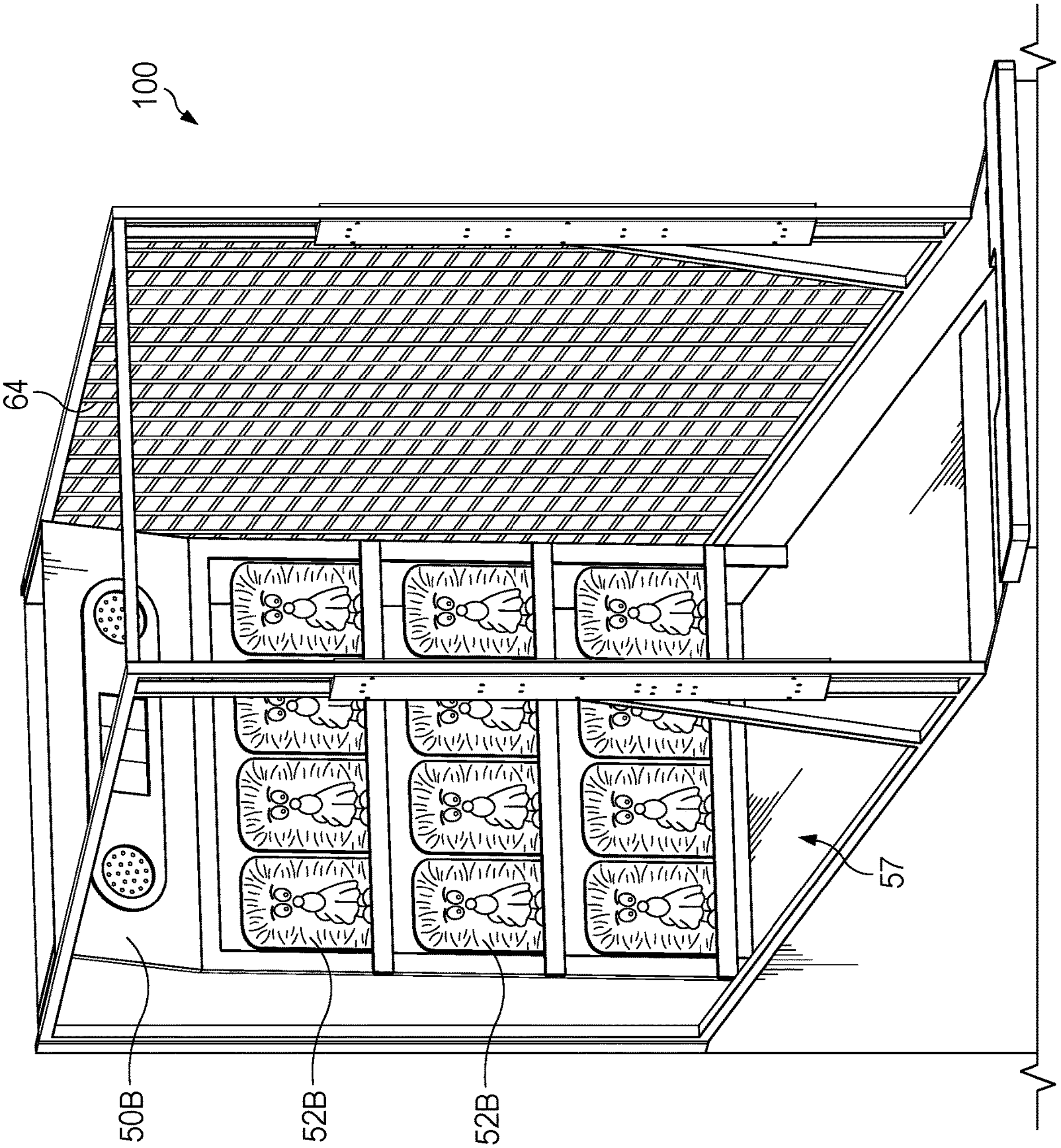
FIG. 6 is a front perspective view of a second exemplary embodiment of a midway-style electronic game machine.
Figure 7:
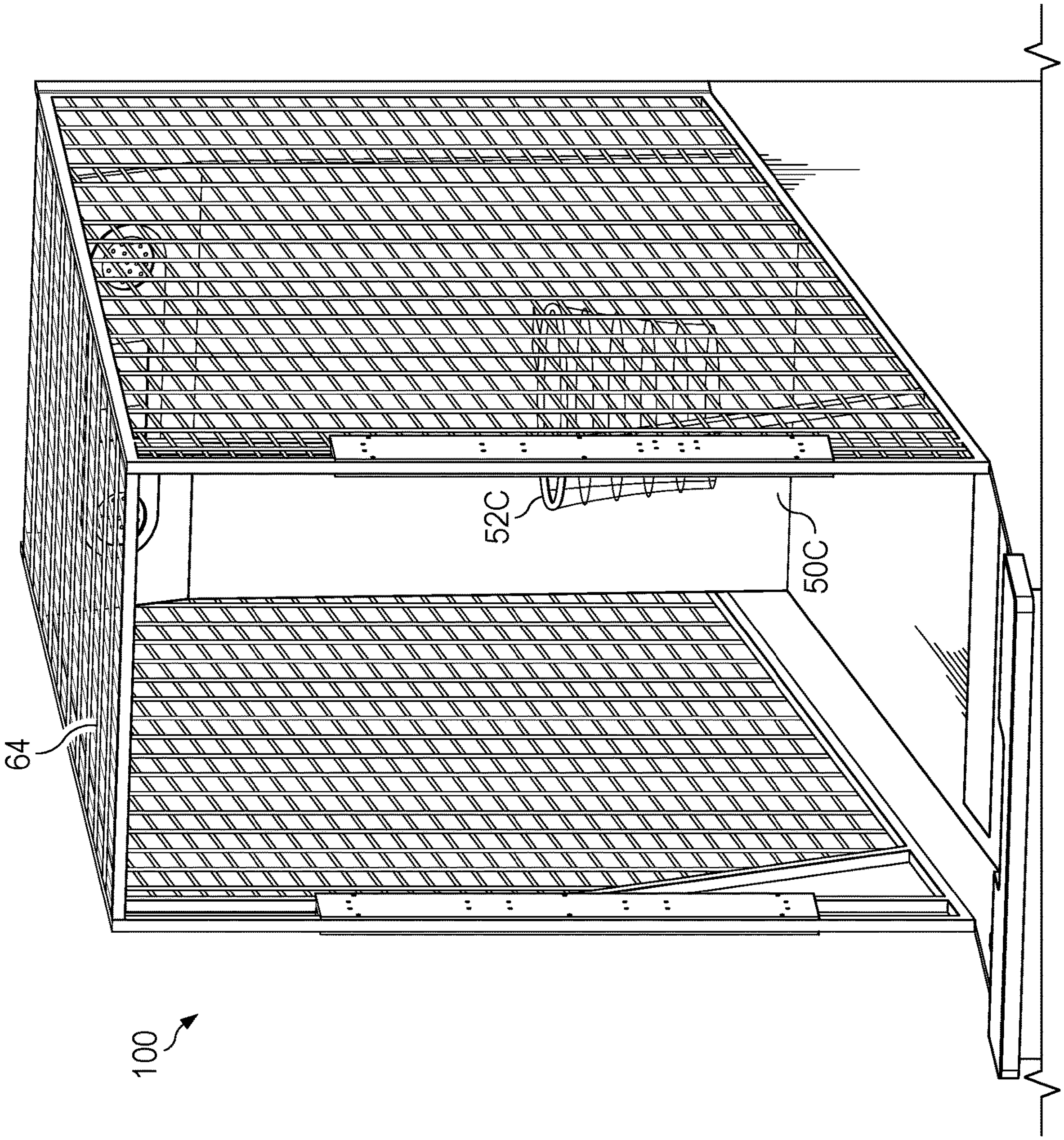
FIG. 7 is a front perspective view of a third exemplary embodiment of a midway-style electronic game machine.
Figure 8:
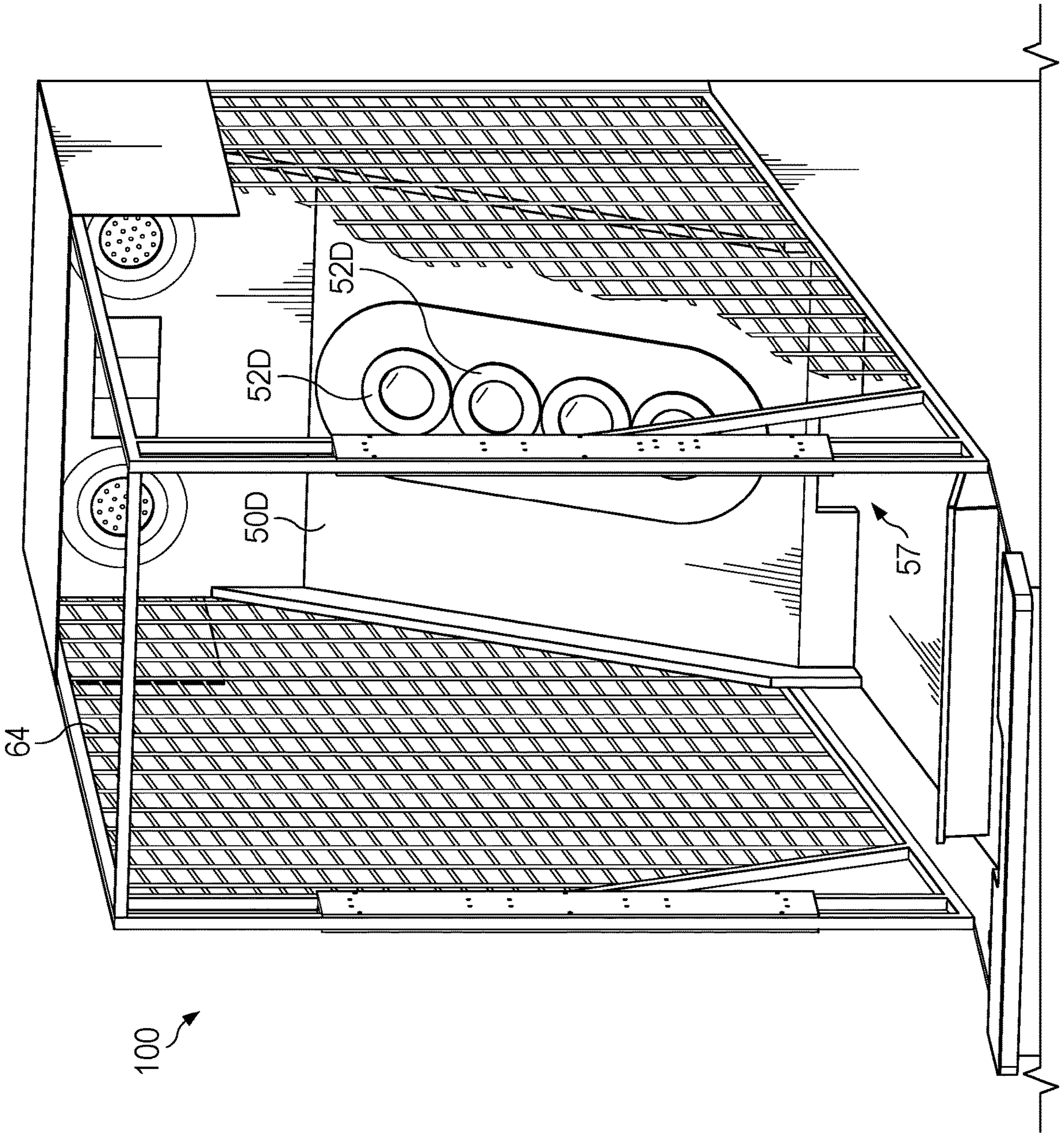
FIG. 8 is a front perspective view of a fourth exemplary embodiment of a midway-style electronic game machine.
Figure 9:
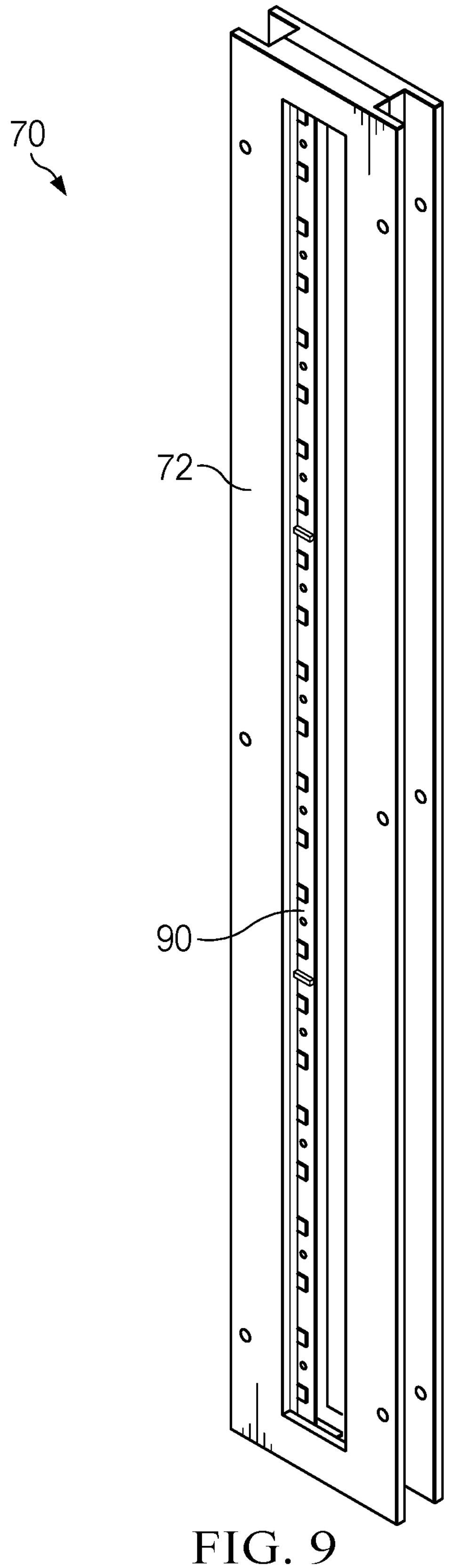
FIG. 9 is a front perspective view of a sensor array and housing.

In exemplary embodiments, the game machine 100 may be provided with netting or caging 64 attached to the frame 60 that surrounds the target cabinet 50 and the passing lane 62 (e.g., FIGS. 6-8). The netting or caging 64 may thereby catch projectiles that ricochet off the target cabinet 50 and prevent the projectiles from ricocheting away from the machine 100.

The game machine 100 is not limited to any particular kind of game projectile. Rather, it is contemplated that there may be a wide variety of projectiles that are suitable for use with the game machine 100. Exemplary projectiles may include, balls, basketballs, darts, bean bags, and/or any other kind of projectile that is typically used in carnival or arcade games.

Referring to FIGS. 6-8, the game machine 100 is not limited to any particular design for the target cabinet 50. Rather, the target cabinet 50 can include any type or combination of structures and objects that would be fun to launch/actuate a projectile at. The target cabinets 50A-50D shown in FIGS. 1 and 6-8 are each designed with a mind towards replicating the play experience of various attendant midway-style games. FIG. 1, for example, includes a generally upright cabinet 50A positioned at the highest point along the ramp section 40, furthest away from the counter section 30, that has a front-facing side featuring a plurality of targets for a player to aim at (here, a 4×4 grid of balloon illustrations 52A). The embodiments of FIGS. 6 and 7 are similar except that they have different kinds of targets—knock-down dolls 52B in FIG. 7 and a basketball hoop 52C in FIG. 8. The embodiment of FIG. 8 is likewise similar, but includes a slanted cabinet 50D and a vertical row of circular openings 52D for targets. The target cabinets 50B, 50D of FIGS. 6 and 8 feature an interior space for collecting projectiles from successful attempts, and a lower opening 56 that projectiles may pass through before traveling down the ramp section.

In exemplary embodiments, the game machine 100 may also include one or more made-shot sensors integrated into the target cabinet 50 and connected to a target 52. These made-shot sensors (or more broadly, "success sensors", meaning any sensor known to those of ordinary skill in the art that detects a successful encounter by a user actuated game projectile with a target) may be configured to detect when a player successfully causes a game projectile to pass through a target opening, or successfully hit a target 52 (e.g., when a dart hits a balloon, or when a basketball passes through a hoop, or other carnival or arcade game contests known to those of ordinary skill in the art).

In exemplary embodiments, the game machine 100 may include a display 54 integrated into the target cabinet 50 to convey information to the player. For example, the display 54 may present information such as number of attempts remaining, number of successful attempts, amount of time remaining, high scores, and the like.

In exemplary embodiments, the game machine 100 may include speakers 56 integrated into the target cabinet 52 for playing audio (e.g., music and/or sounds) to enhance the interactive aspect of the game machine 100 (e.g., by providing audio feedback).

Figure 2:
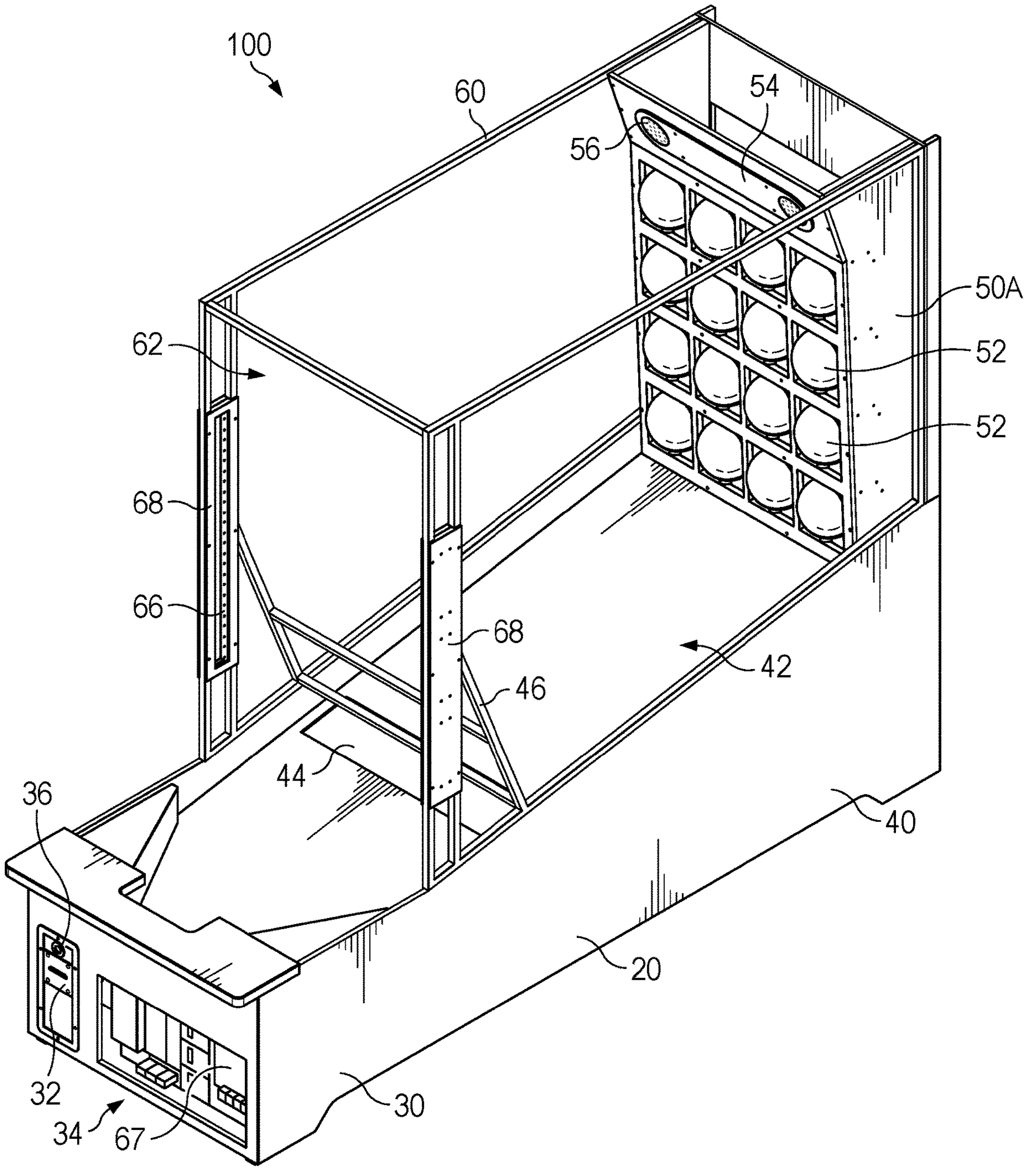
FIG. 2 is a top perspective view of the machine of FIG. 1.
Figure 3:
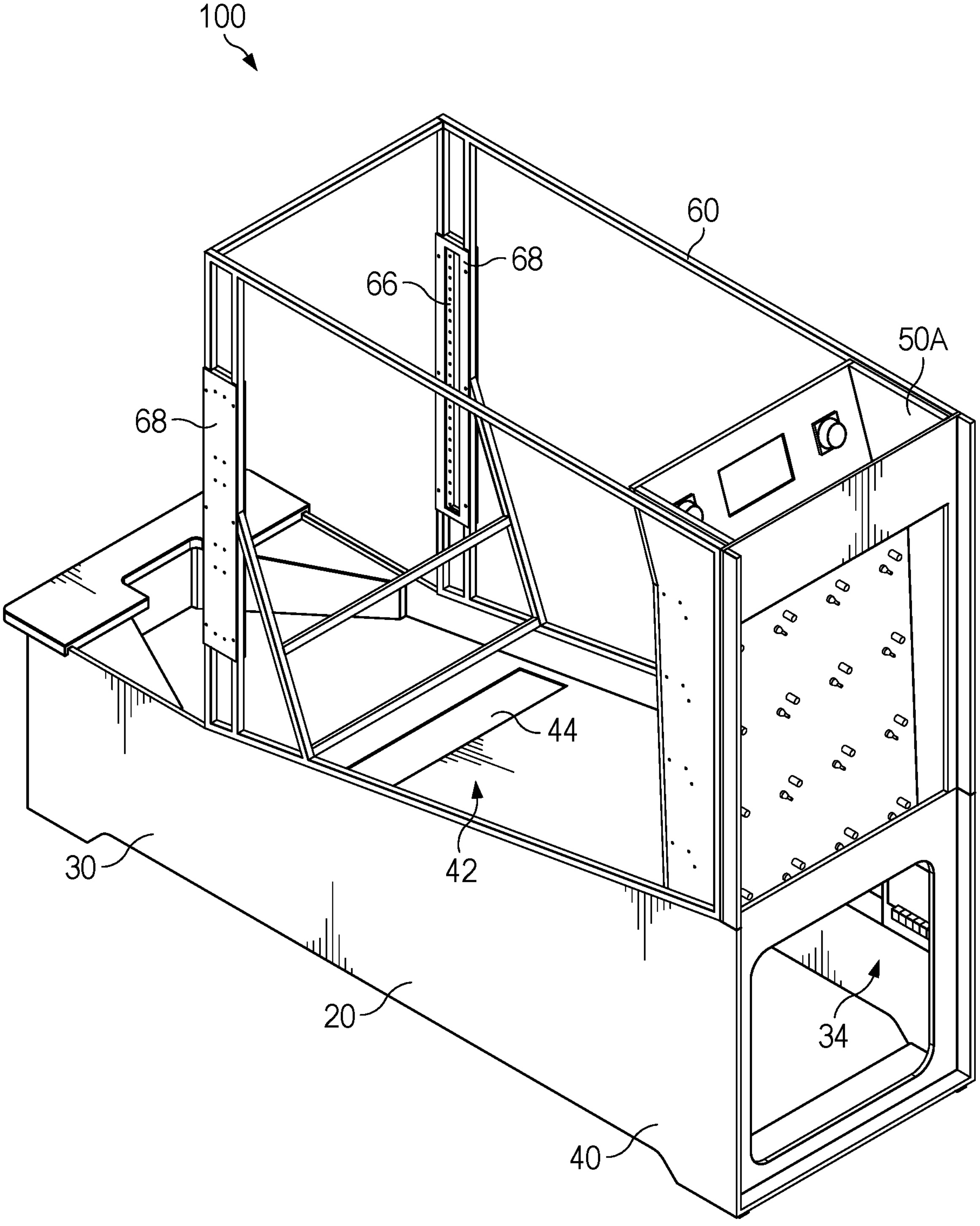
FIG. 3 is a rear perspective view of the machine of FIG. 1.
Figure 4:
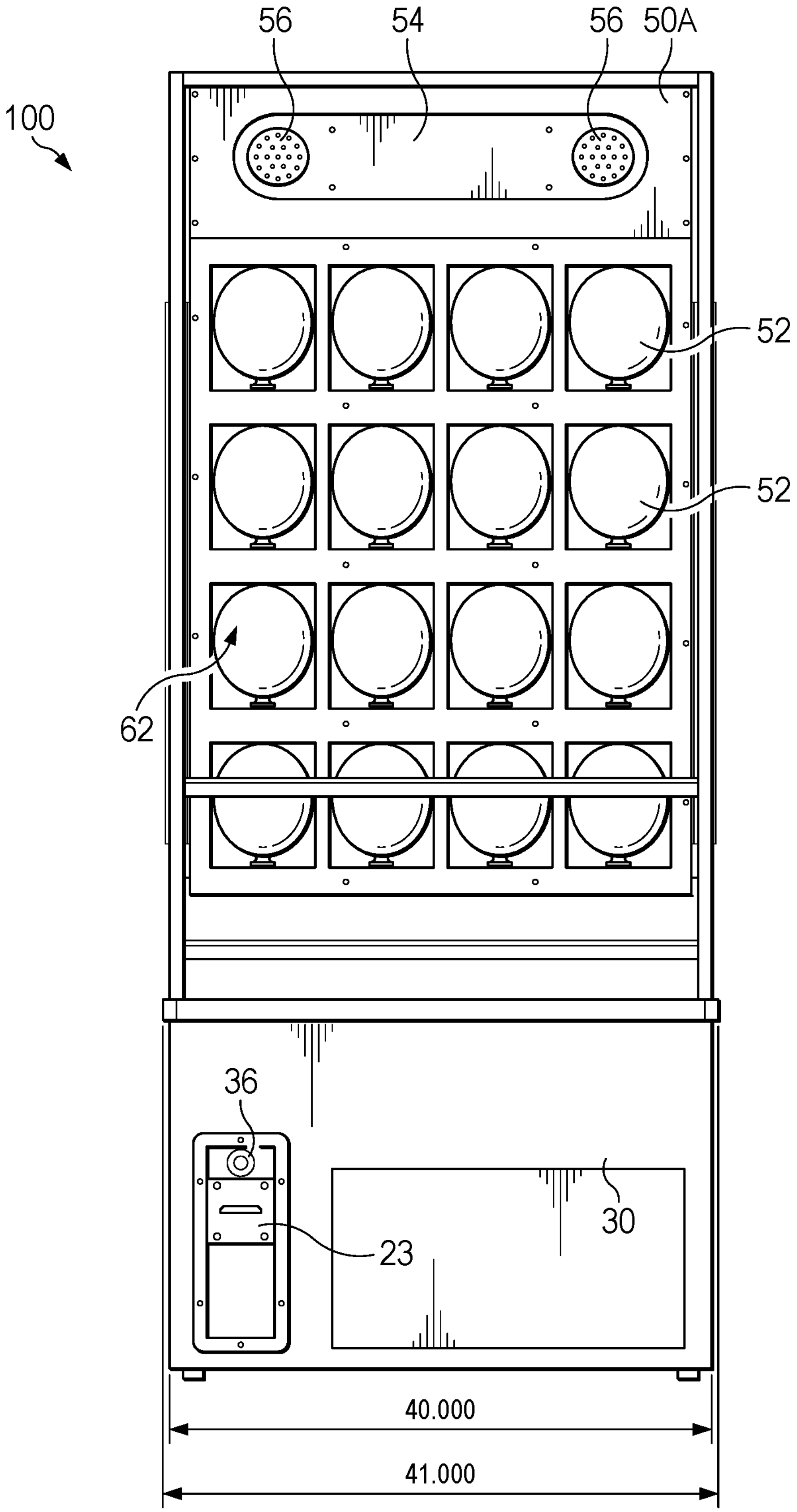
FIG. 4 is a front view of the machine of FIG. 1.

As shown in FIGS. 2 and 3, the game machine 100 includes one or more control units 34 that may each comprise any suitable configuration of computing components and circuitry (e.g., processors, memory, RAM, power supply, wireless communication protocols, logic board, etc.) required to enable the functions described in this disclosure, as well as the coordination and control of the various electronic components described in this disclosure, either individually or in coordination with one another (e.g., payment device 32, game start device 36, reward dispenser, gate 44, made-shot sensors, display 54, speakers 56, sensor arrays 66, etc.).

One issue with midway-style games, both here with the game machine 100 and in traditional midway-style games, is the issue of players taking unauthorized attempts. This can occur if a player "rebounds" (i.e., recaptures) a projectile that ricochets back to the player (e.g., through the passing lane) after an unsuccessful attempt and the player tries again. This can also occur if the player somehow secures an extra projectile, for instance, through underhanded means. Preventing such illicit player behavior is one reason why an attendant is usually required for midway-style games.

It is an object of the present invention to remove the need for a human attendant. Towards that end, the game machine 100 includes one or more detectors that may be in the form of sensor arrays 66 positioned near the passing lane 52 that are configured to detect the presence, movement, and direction of game projectiles passing through a detection area (e.g., passing lane 52). In preferred embodiments, the sensors may also be configured to detect the size of the projectiles.

Referring to FIG. 1, the present disclosure provides an exemplary embodiment of a sensor array configuration. Here, the game machine 100 includes two opposing sensor array housings 68 vertically attached to the frame 60 near the counter section 30. The sensor array housings 68 house a plurality of sensor arrays 66 that are oriented facing the passing lane 52.

Referring to FIGS. 9-12, the present disclosure provides an exemplary embodiment of a sensor array configuration and housing 70, which may be representative of the sensor arrays 66 and housings 68 shown in FIG. 1. Here, the housing 72 is elongated in shape and features a two-piece design—an inner piece 74 that faces the passing lane 52, and an outer piece 76 that faces away from the passing lane 52. The outer piece 76 and inner piece 74 each include flanges 78 that enables the housing 72 to clamp onto the frame 60 when the two pieces 74, 76 are fitted together. The outer piece 76 includes a center portion 86 where the sensor arrays 90 may be mounted. The inner piece 74 includes a center portion 84 that defines an opening 82 for receiving the sensor arrays 90 and enabling the transmission and receipt of signals. In preferred embodiments, the opening 82 of the inner piece 74 may also be provided with a window 80 for added protection for the sensor arrays 90 (best shown in FIGS. 6-8).

Figure 10:
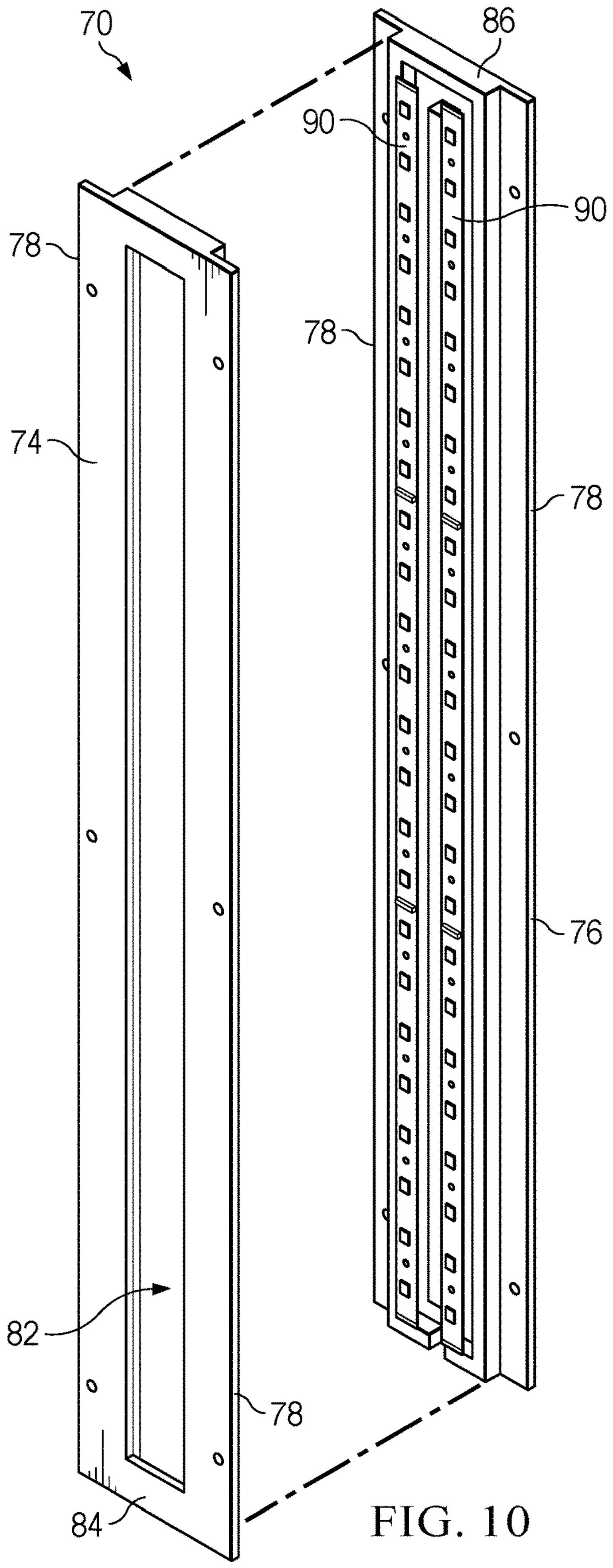
FIG. 10 is an exploded front perspective view of the sensor array and housing of FIG. 9.
Figure 11:
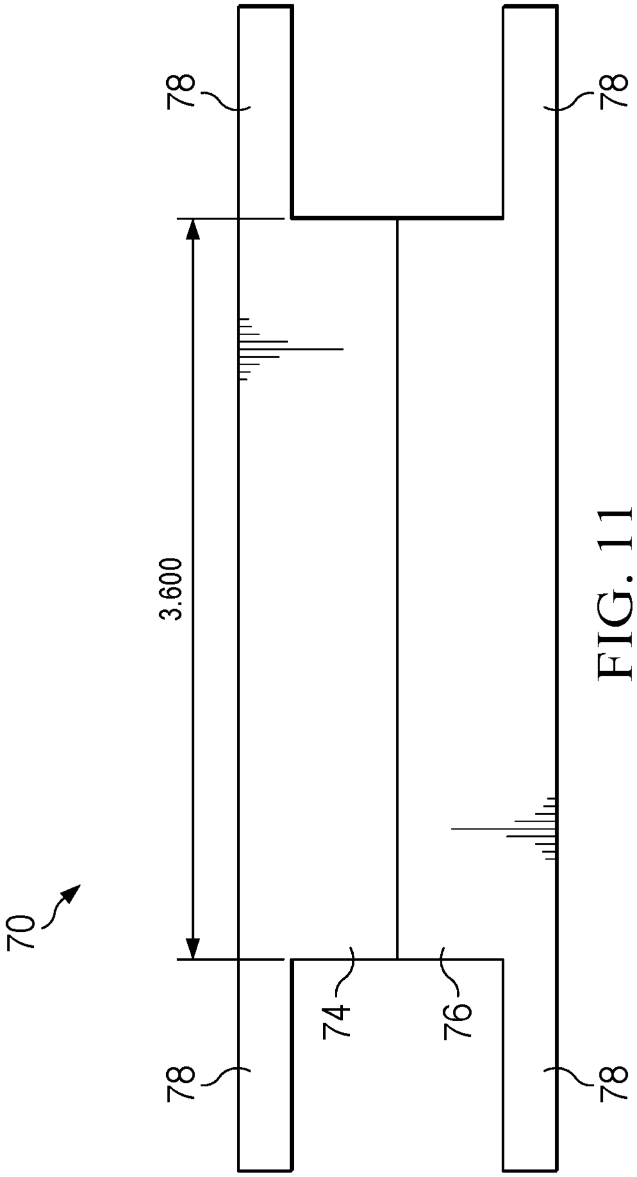
FIG. 11 is a top view of the sensor array housing of FIG. 10.
Figure 12:
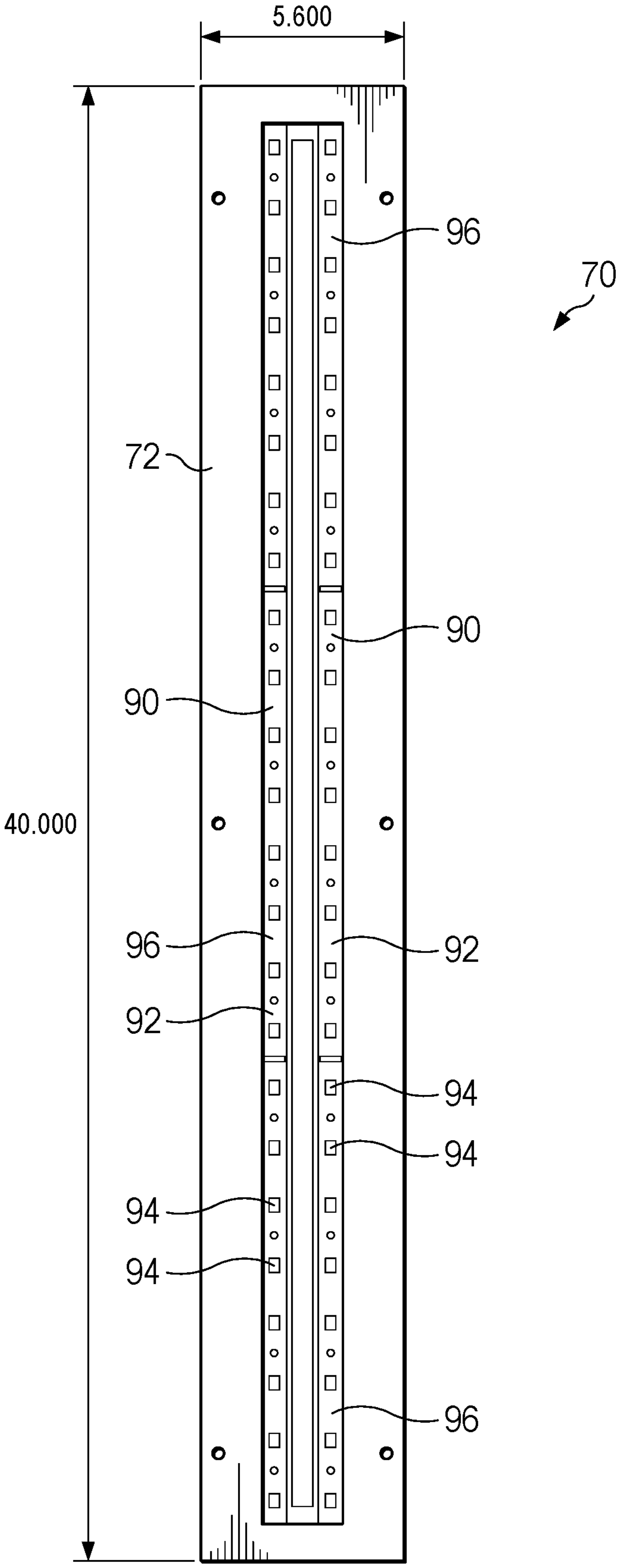
FIG. 12 is a front view of the sensor array and housing of FIG. 10.

Referring to FIG. 10, the outer piece 76 may have two linear sensor arrays 90 mounted to it. The sensor arrays 90 may be oriented parallel to one another and may extend along the length of the housing 72. By this design, the game machine 100 of FIG. 1 would have four sensor arrays 66 in total between the two housings 68.

Each sensor array 90 comprises a printed circuit board (PCB) 92 with a plurality of sensor components 94 (e.g., transmitters and receivers) installed on it. It is generally contemplated that the sensor arrays need not be limited to any particular type of sensing technology, and that any suitable type of sensor component may be installed. In a preferred embodiment, the sensor array may include infrared sensor components.

The sensor array PCB can be a single PCB or a collection of several smaller PCBs. In the embodiment shown, the sensor array includes three sensor array units 96 aligned in a row, each having eight equally spaced sensor components 94 attached thereto. It is contemplated that the length of any sensor array can be lengthened or shortened as needed by either adding or removing one or more of these sensor array units 96.

Referring back to FIG. 1, in this embodiment each sensor array 66 is configured to operate with the sensor array 66 directly opposite to it (i.e., in the opposite housing 68). For example, a sensor array in one housing may include sensor components that are all transmitters; and the sensor array in the opposite housing may include sensor components that are all receivers. In effect, this sensor array configuration would result in two parallel detection planes (i.e., the "detection areas") located between the two housings 68, each comprising a vertical cross-section of the passing lane 62. By detecting interruptions in these detection planes, the sensor arrays 66 may be able to detect the presence, movement, and direction of projections passing through the passing lane 62. One way of doing so may involve determining a sequence in which the sensor arrays detect interruptions in the detection planes (i.e., which one detects the same interruption first indicates which direction a projectile's trajectory follows through the passing lane 62). If, for example, the counter-side detection plane gets interrupted first followed by an interruption in the target-side detection plane, then that may indicate that a player has thrown a projectile from the counter section towards the target cabinet. If the reverse is true, then that may indicate that a projectile has inadvertently ricocheted back towards the counter section from the target cabinet (and can thereby be properly accounted for).

In exemplary embodiments, the sensor array(s) 66 may be operatively connected to a control unit 67 (or electronic controller) in communication with the detector(s), which may be configured to count the number of projectiles that pass though the passing lane 52 and automatically end a game play session once a user has actuated the predetermined number of game projectiles toward the target. This can be for either direction (i.e., either from the counter section 30 to the target cabinet 50 or from the target cabinet 50 to the counter section 30). In a preferred embodiment, however, the sensor array(s) 66 and a control unit may be configured to count the projectiles moving in the direction of the player to the target cabinet 50, and not count the projectiles that move in the reverse direction (from the target cabinet 50 back to the player). It is contemplated that this functionality may enable the game machine 100 to detect and recognize a correct number of attempts that a player is authorized to make, while disregarding any unauthorized attempts. It is contemplated that by this functionally, an attendant is no longer need for the administration of midway-style games.

In the embodiment of FIGS. 1-5, the sensor arrays are linear and arranged vertically relative to the passing lane. Although this configuration is considered exemplary, it is not meant to be limiting. It is contemplated that in other embodiments, the sensor arrays may be linear and oriented horizontal relative to the passing lane. Alternatively, the sensor arrays may be curved or arc-shaped, thereby resulting in circular or ovoid detection planes. Variations such as these will not result in a departure from the scope of the present disclosure.

The embodiment of FIGS. 1-5 features an opposing sensor array configuration wherein one sensor array functions as a transmitter and the other sensor array functions as a receiver (with the two sensor arrays collectively generating a detection plane). It is contemplated that single sensor array confirmations may also be utilized. Such a sensor array configuration may include, for example, a single sensor array that is equipped with both transmitting and receiving components such that an opposing second sensor is not required. Variations such as this will not result in a departure from the scope of the present disclosure.

The embodiment of FIGS. 1-5 features a sensor array configuration featuring parallel rows of sensor arrays which results in parallel detection planes. It is contemplated that senor array configurations that cover non-parallel detection areas may also be utilized. These sensor array configurations may entail, for example, non-liner arrangements of transmitters and receivers. Variations such as these will not result in a departure from the scope of the present disclosure.

An exemplary sensor component that may be utilized in this design can include, for example, the TSAL-6200 available from Vishay Intertechnology, Inc. of Malvern Pennsylvania.

An exemplary sensor component that may be utilized in this design can include, for example, the TSMP-6000 available from Vishay Intertechnology, Inc. of Malvern Pennsylvania.

Referring to FIGS. 13-16, to further compensate for the lack of human attendants the game machine 100 may be equipped with a virtual attendant device (herein, the "VA device") configured to interact with players and to perform many of the functions a human attendant normally would—e.g., greeting players and inviting them to play the game, encouraging players, explaining game rules and instructing the player on how the game is played, and discouraging players from cheating or otherwise behaving in an unauthorized manner, rewarding players, etc. The presence of a VA device near the game machine 100 may make the game more fun, inviting, and interactive; and may therefore attract more players to the game.

Figure 13:
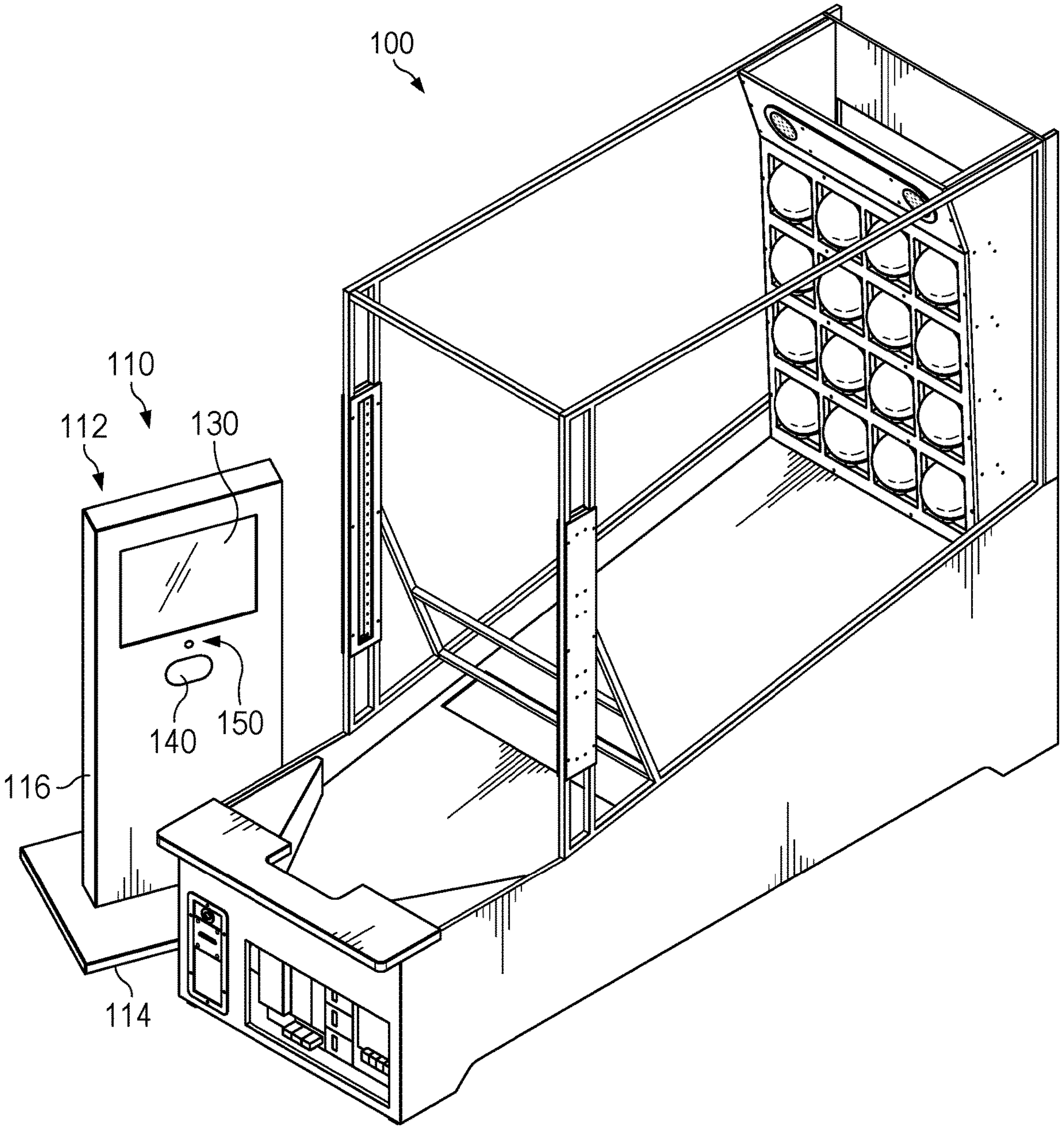
FIG. 13 is a top perspective view of an embodiment of the game system of the present invention having a game machine and an electronic virtual attendant display therewith.
Figure 14:
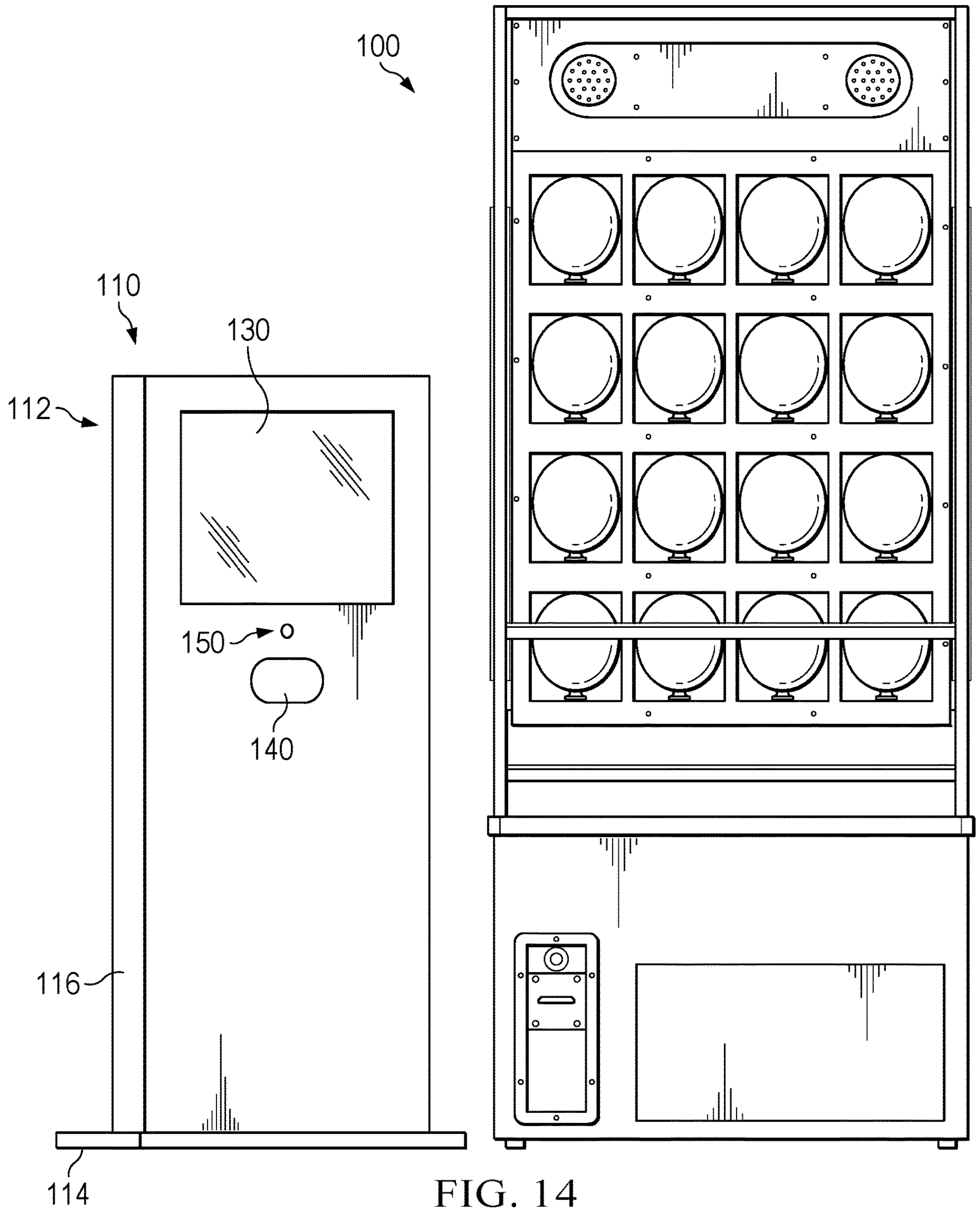
FIG. 14 is a front elevation view of the game system of FIG. 13.

Referring to FIGS. 13 and 14, the VA device 110 includes a housing 112, a display screen 130, and a speaker 140. The display screen 130 and the speaker 140 are integrated into the housing 112. In general, it is contemplated that the housing 112 should enable the display screen 130 and the speaker 140 to be oriented towards the player and positioned in a location with unobstructed sight and hearing, thereby making it easier for the player to interact with the VA device 120. In the embodiment shown, the housing 112 is a stand-alone floor-sign-type or kiosk style housing featuring a base 114 and a vertically oriented body 116. The display screen 130 and the speakers 140 are preferably integrated into the body 116, with the display screen 130 and speakers 140 preferably being approximately eye- and chest-level, respectively, with an average height player.

Figure 15:
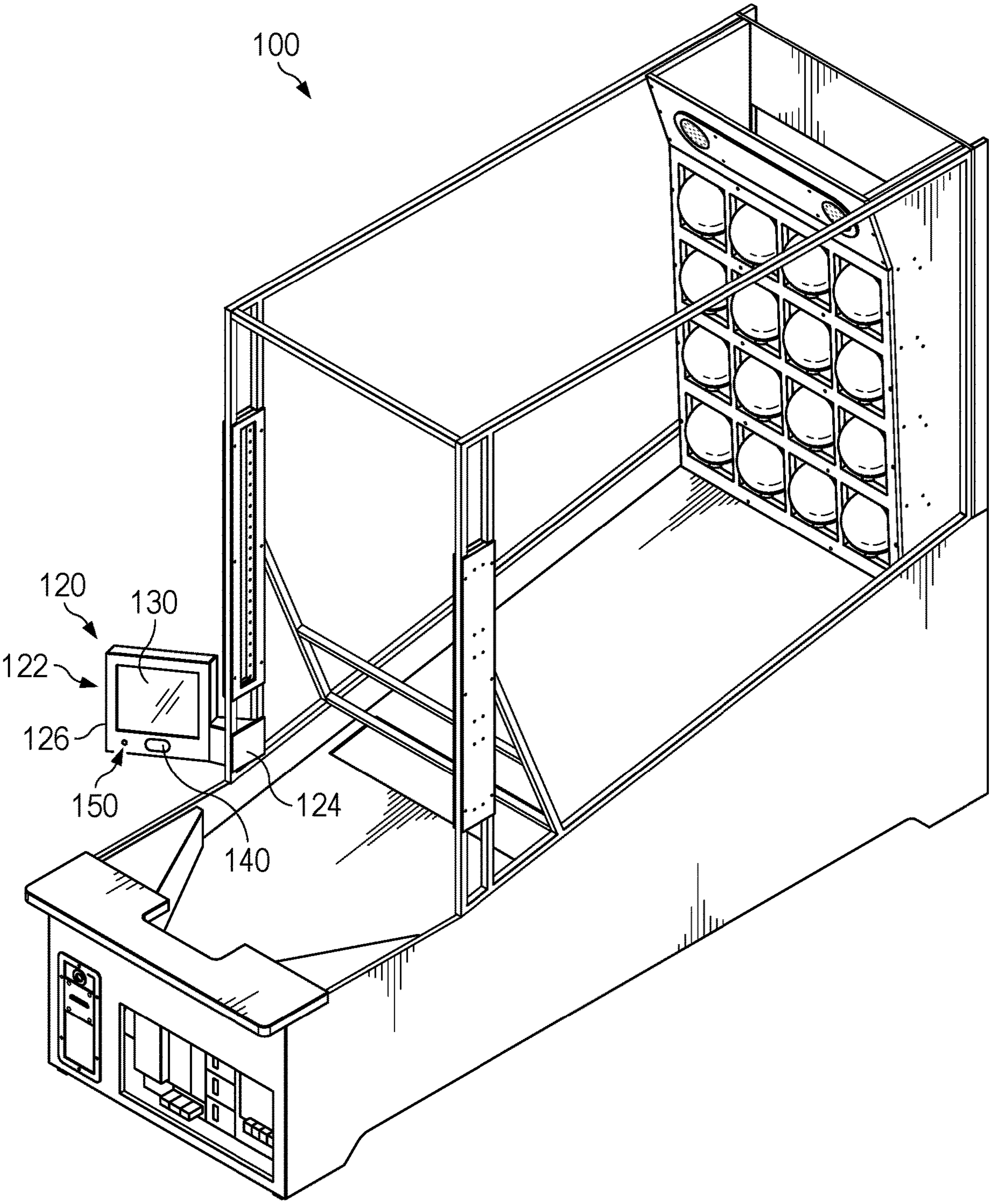
FIG. 15 is a top perspective view of another embodiment of the game system of the present invention having a game machine with an attached electronic virtual attendant display.
Figure 16:
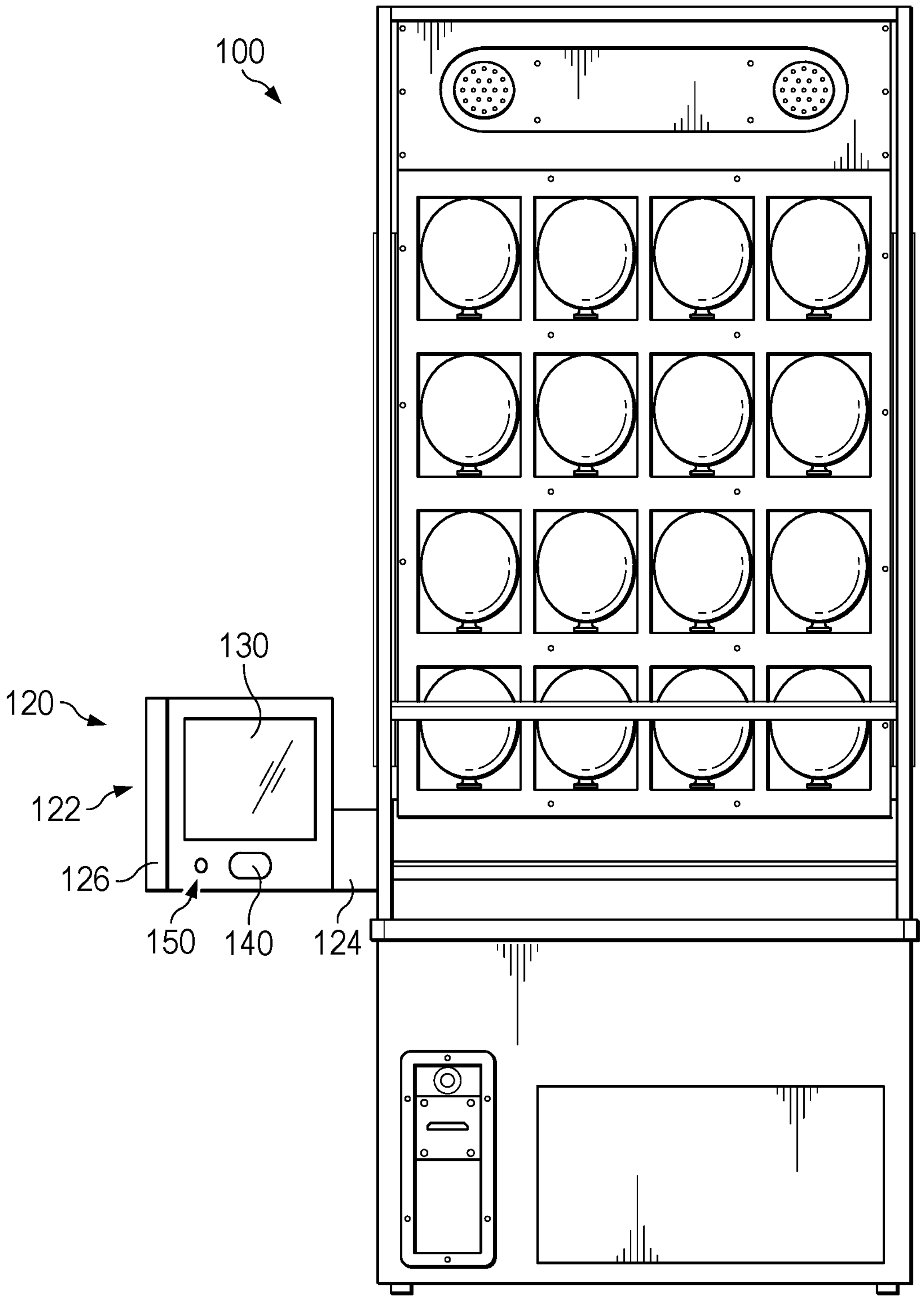
FIG. 16 is a front elevation view of the game system of FIG. 15.

The embodiment of FIGS. 13 and 14 notwithstanding, it is contemplated that VA housings of different sizes, shapes, and overall design may be utilized as well. For example, FIGS. 15 and 16 show a second embodiment of the VA device 120 that features a housing 122 configured for direct attachment to the game machine 100 (rather than being a stand-alone housing). This embodiment of the housing 122 may be smaller and features an attachment end 124 that attaches the main housing body 126 to the frame 60 of the game machine 100. Variations such as these will not result in a departure from the scope of the present disclosure.

The VA device may utilize any suitable type of display screen 130. The display screen 130 does not need to be limited to any particular type, size, or shape. For example, it is contemplated that display screens such as indoor or outdoor liquid crystal displays (LCDs), light emitting diode displays (LEDs), and the like may be suitable. It is also contemplated that 12-inch display screens, 15-inch display screens and much larger (such as 72-inch displays) may be suitable. The hardware (e.g., display screen, housing, chassis, frame) for such displays is commercially available from various display suppliers.

The VA device may utilize any suitable type of speaker(s) 140. The speaker 140 does not need to be limited to any type, size, or shape as long as it has sufficient volume capability to be heard over crowds at arcades, fairs, etc. (outdoor weatherable speaker(s) would need to be used for outdoor environments). The speaker(s) may be provided inside the display chassis or may be separate from the display and electronically connected to the display. Numerous suitable speakers are commercially available.

Figure 21:
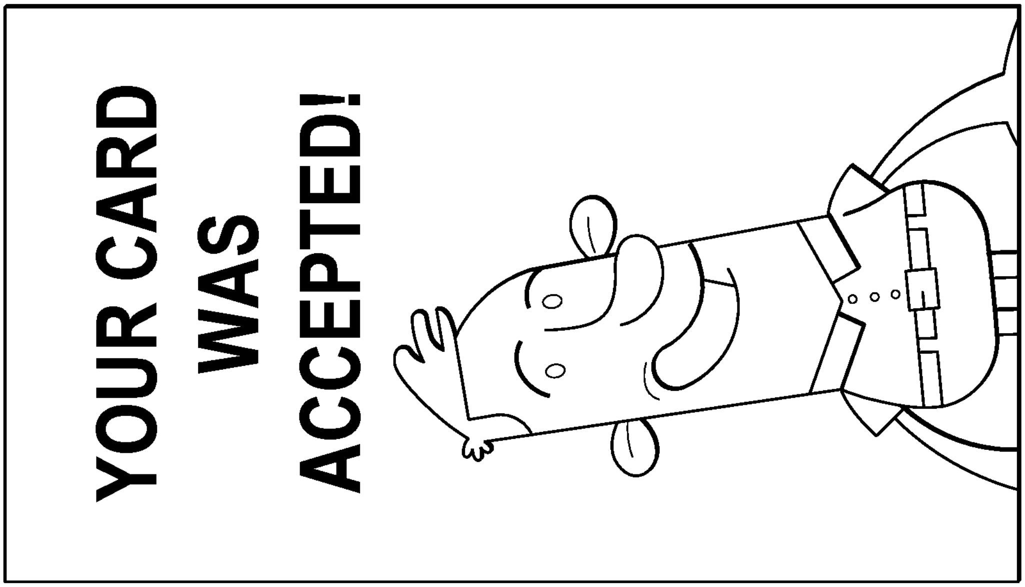
FIG. 21 is a frame taken from a payment acknowledgement video.
Figure 22A:
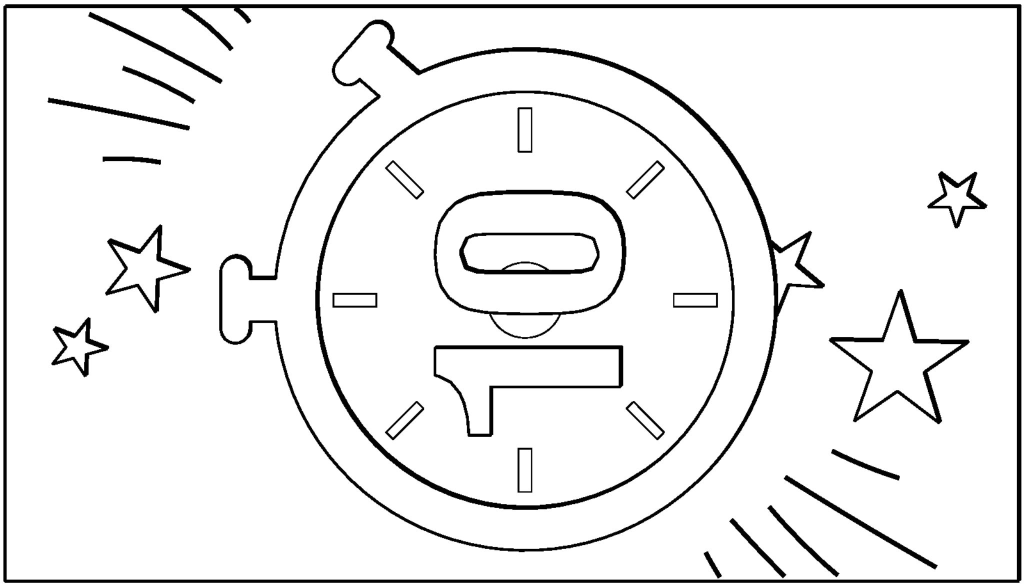
FIGS. 22A-22C are frames taken from a countdown video.
Figure 22C:
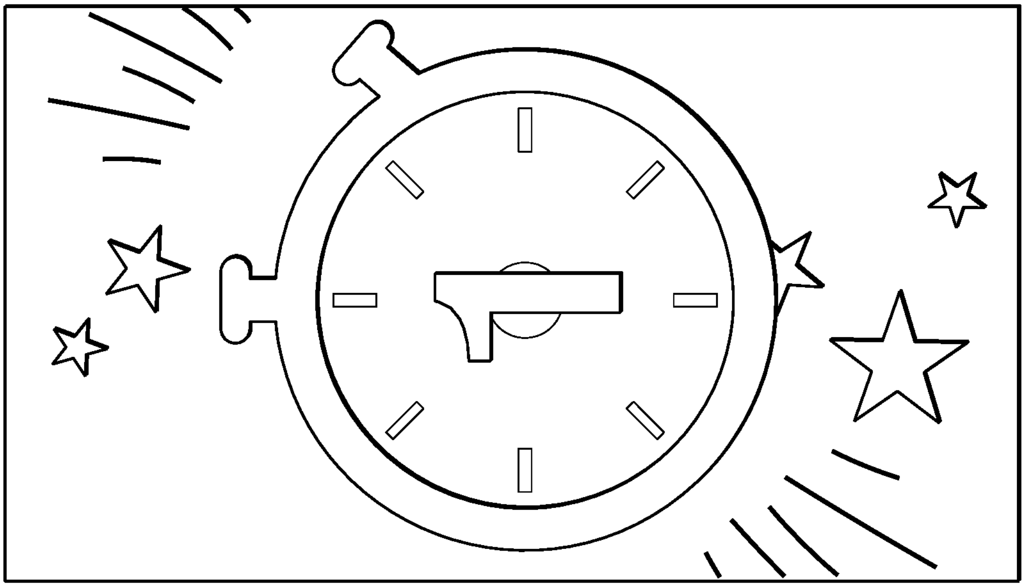
Figure 22B:
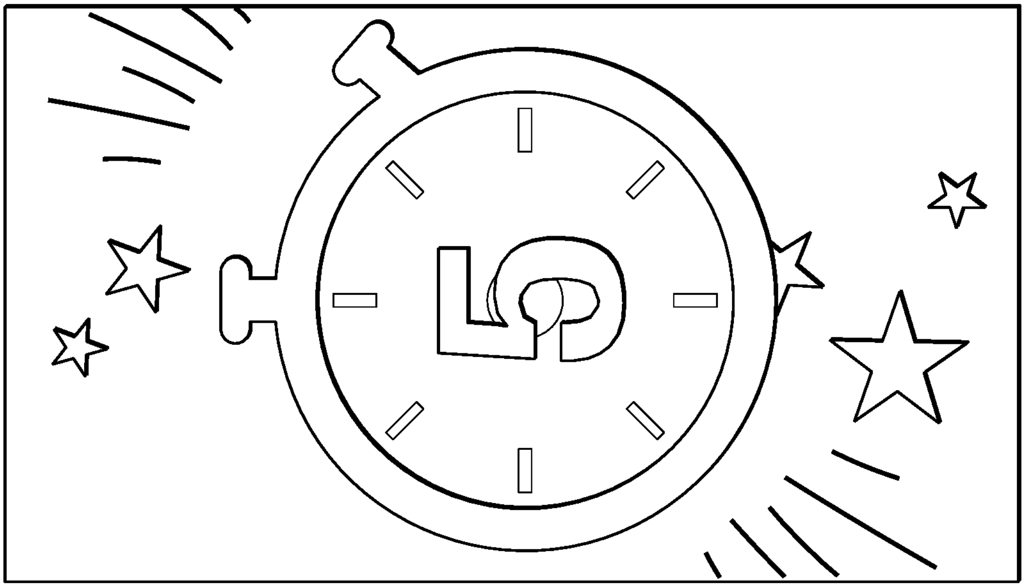
Figure 23B:
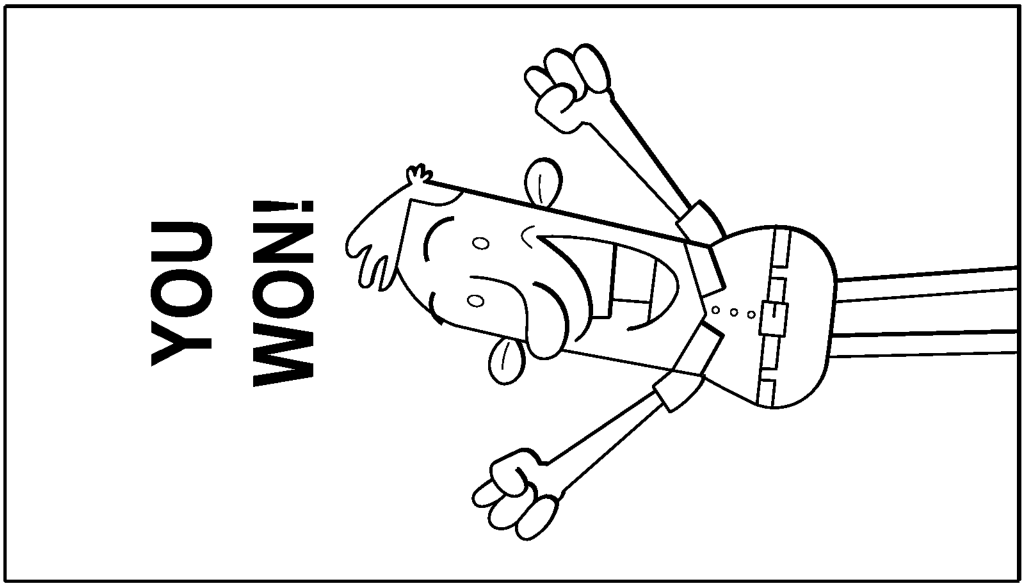
FIGS. 23A-23B are frames taken from a victory video.
Figure 23A:
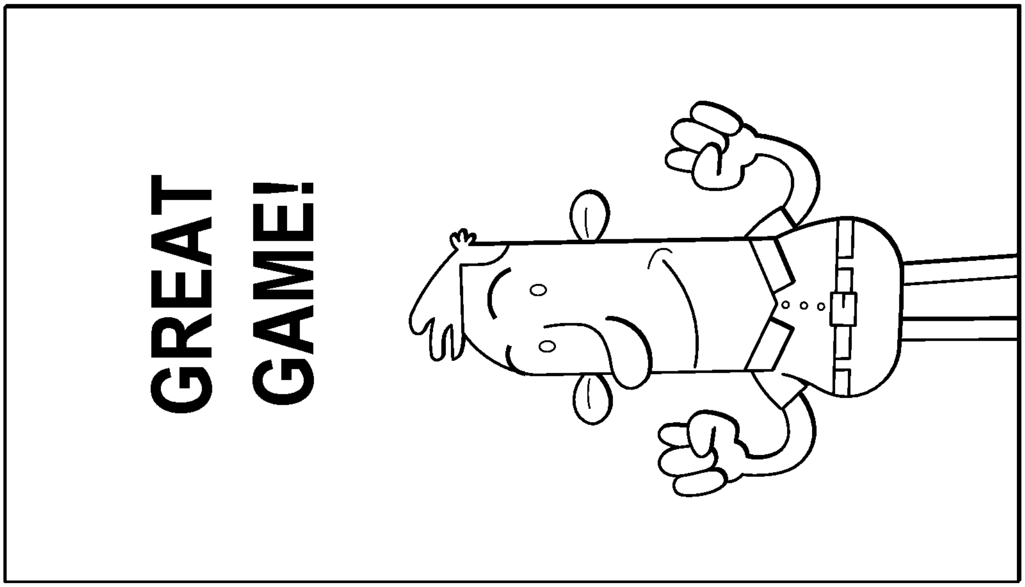
Figure 24B:
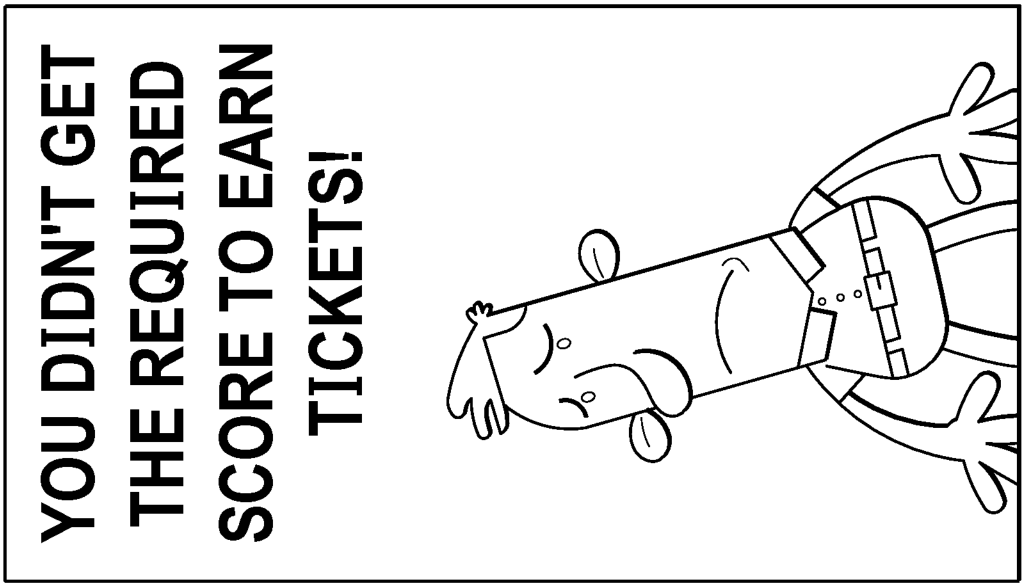
FIGS. 24A-24B are frames taken from a defeat video.
Figure 24A:
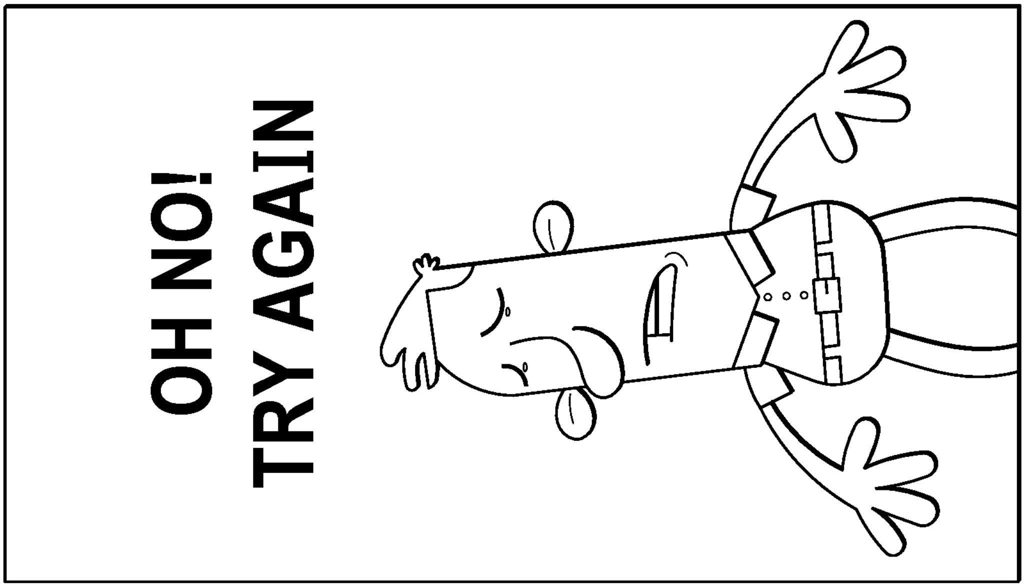

Referring to FIG. 21, the various components of the VA device (e.g., display screen 130, the speakers 140, the sensors described below, etc.) may be operatively connected to a control unit that coordinates said components and enables user control over them. The control unit may be a stand-alone control unit housed within the VA device housing (ref. nos. 112 or 122). The control unit can include any suitable configuration of electronic circuitry and components capable of enabling the features and functions described herein. It is contemplated that a control unit may include, for example, a motherboard, one or more processors (e.g., central processing unit and/or graphic processing unit), random access memory, memory storage, power supply, and the like. It is also contemplated that a control unit may include a dedicated player module for multimedia applications (i.e., audio and visual playback) (e.g., a video controller). These components can be modular or integrated. A control unit may also be specialized in design as a programmable logic controller (PLC).

In one or more embodiments, the VA device includes memory that stores a database of media files. These media files can include, for example, audio files, video files, text files, and/or multimedia files containing some combination of audio, video, and text. The media files may be of any duration, e.g., 60 seconds, 30 seconds, 10 seconds, 5 seconds, 3 seconds, etc. These media files may be utilized for a variety of different purposes. For example, the media files may include audio files of sound and/or music for making a gameplay session more fun, interactive, or immersive. In another example, the media files may include files containing spoken word (i.e., scripts) such as gameplay instructions, commands, warnings, greetings, phrases (e.g., words of encouragement), and the like. In yet another example, the media files may include multimedia files of decorative and/or graphical illustrations or text or video (of an actor(s)) relating to gameplay instructions.

Preferably, the media files would include files related to an attendant. That is to say, multimedia files containing animations and/or video recordings of an attendant (referred to herein as a "virtual attendant") behaving as a human attendant would if the human attendant was administering/overseeing the game machine. This can include, for example, animations and/or video of a virtual attendant: waiting for players, greeting players, encouraging players to play the game, instructing players on how to play the game, informing the player of the score and/or time remaining in a gameplay session, warning players not to cheat or interact with the game machine in an unauthorized way, etc. There are many other attendant-player interactions that may be represented with a media/multimedia file, and inclusion of these files is within the scope of the present disclosure.

It is contemplated that the VA device may be reactive in nature. That is to say, the VA device may be configured to gather information about the status of game machine 100, the surrounding environment, the state or status of a gameplay session, etc., and then play an appropriate media file if/when a predetermined event or a change in condition occurs (i.e., a "trigger").

Figure 17:
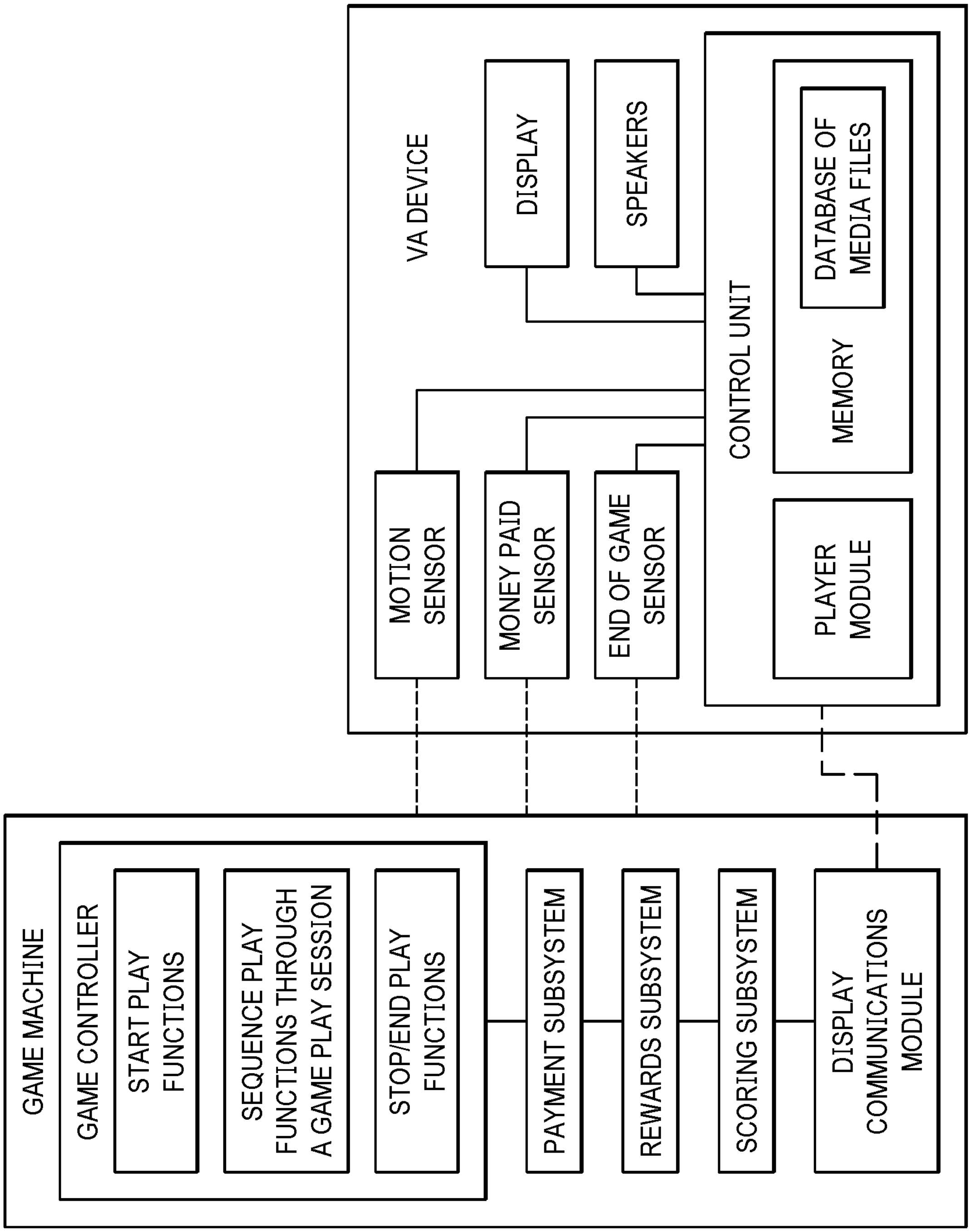
FIG. 17 is a nested block diagram of a game system of the present invention.

Referring to FIG. 17, one way in which the VA device may be configured to gather information is through the use of sensors. In the embodiment shown, the VA device includes three different sensors—a motion sensor, a payment-received sensor, and an end-of-game sensor.

Referring to FIGS. 13-16, the motion sensor 150 may be integrated into the forward-facing side of the VA device housing and oriented towards the counter section of the game machine 100. The motion sensor 150 may be configured to detect when a player has approached the game machine 100 and transmit such data to a control unit of the VA device. Alternatively, the motion sensor 150 may be incorporated or otherwise positioned in different locations/orientations. It is contemplated that more than one motion sensor may be utilized. It is contemplated that any suitable type of sensor may be utilized as the motion sensor such as, for example, infrared, microwave, and/or dual tech/hybrid sensors. In some embodiments, the motion sensor may be a lidar sensor. In some embodiments the VA device may include a plurality of lidar sensors.

Referring to FIG. 17, the payment-received sensor can be provided within or outside of the VA device housing. The payment-received sensor can be configured to detect when the game machine 100 has received payment and transmit such data to a control unit of the VA device. It is contemplated that more than one payment-received sensor may be utilized. It is contemplated that any suitable type of sensor can be utilized as a payment-received sensor such as, for example, ultrasonic, infrared, microwave, and/or dual tech/hybrid sensors. If the game machine is equipped with a payment device (e.g., ref. no. 32 in FIGS. 1 and 2), the payment-received sensor may be incorporated either near it or within it. In one example, the payment-received sensor may detect when a card has been swiped, or when a game token or coin has been inserted into the game machine 100, etc.

Figure 5:
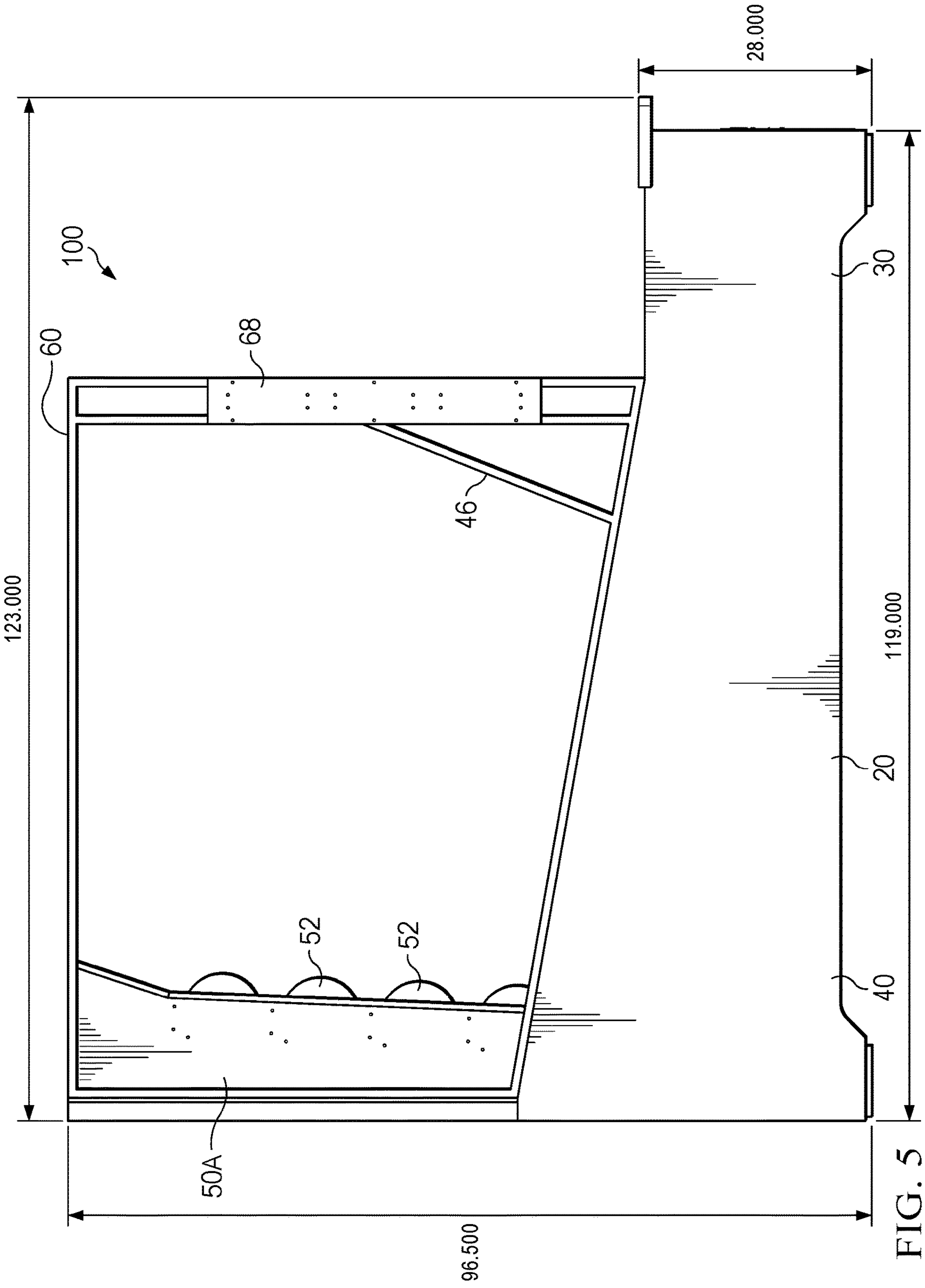
FIG. 5 is a side view of the machine of FIG. 1.

Still referring to FIG. 5, the end-of-game sensor may be configured to detect when a gameplay session has ended and relay such information to a control unit of the VA device. For example, the end-of-game sensor may be a position sensor for sensing when a predetermined number of projectiles has been collected by the game machine 100. In another example, the end-of-game sensor may be a motion sensor for detecting when the player has thrown a predetermined number of projectiles.

Figure 18:
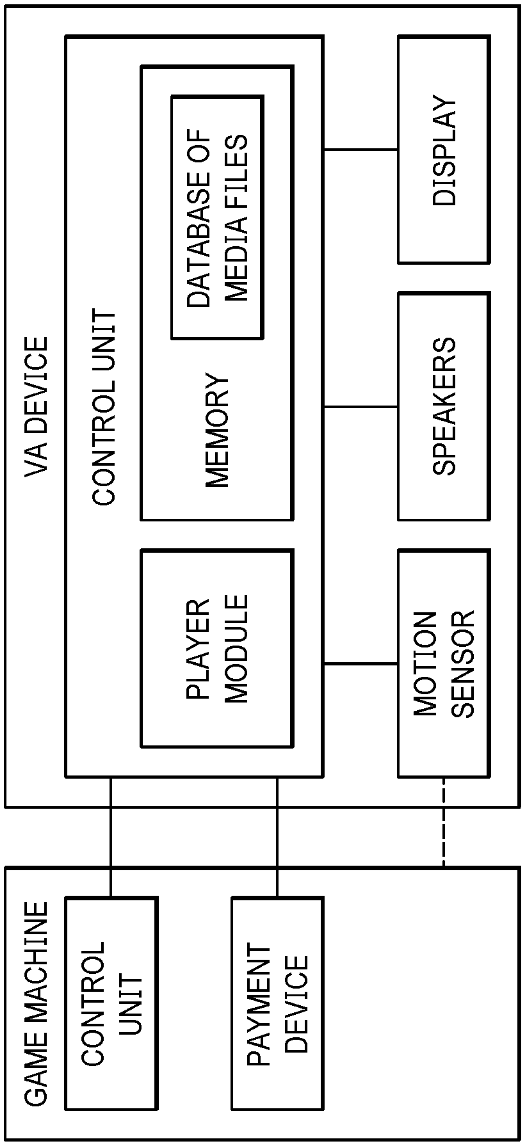
FIG. 18 is a diagram of another version of the game system of the present invention.
Figure 19A:
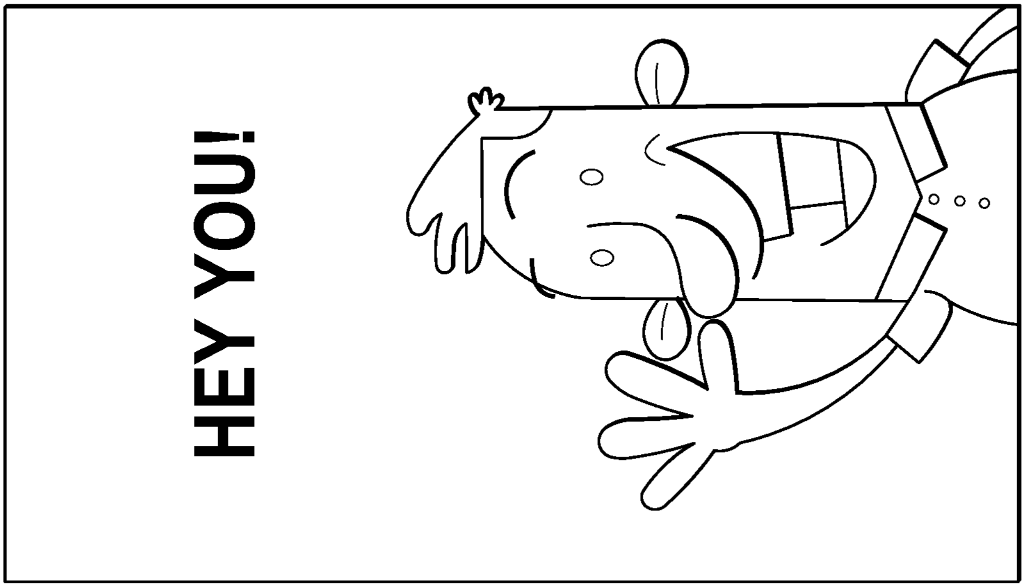
FIGS. 19A-19D are frames taken from a beckoning video.
Figure 19B:
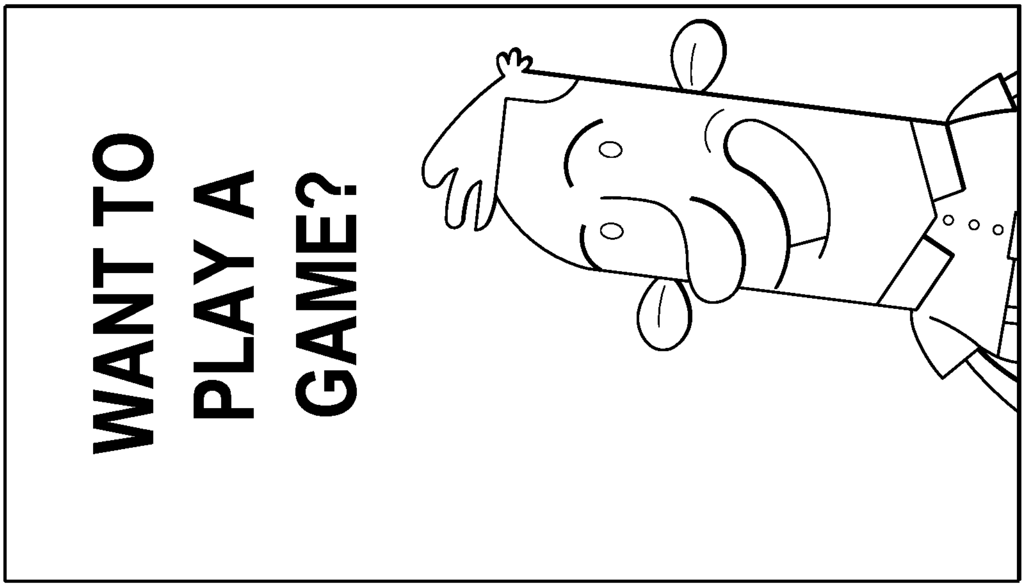
Figure 19C:
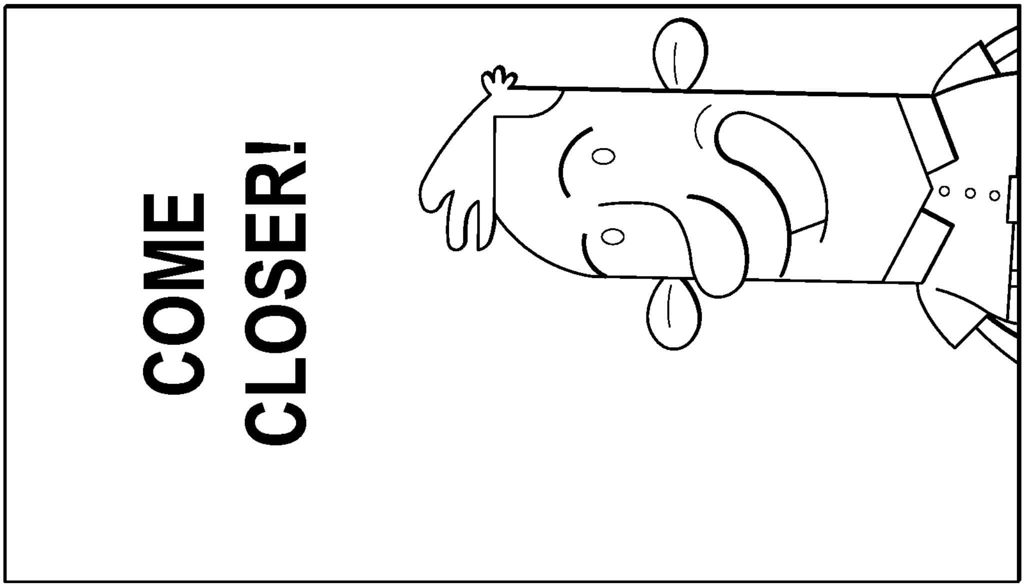
Figure 19D:
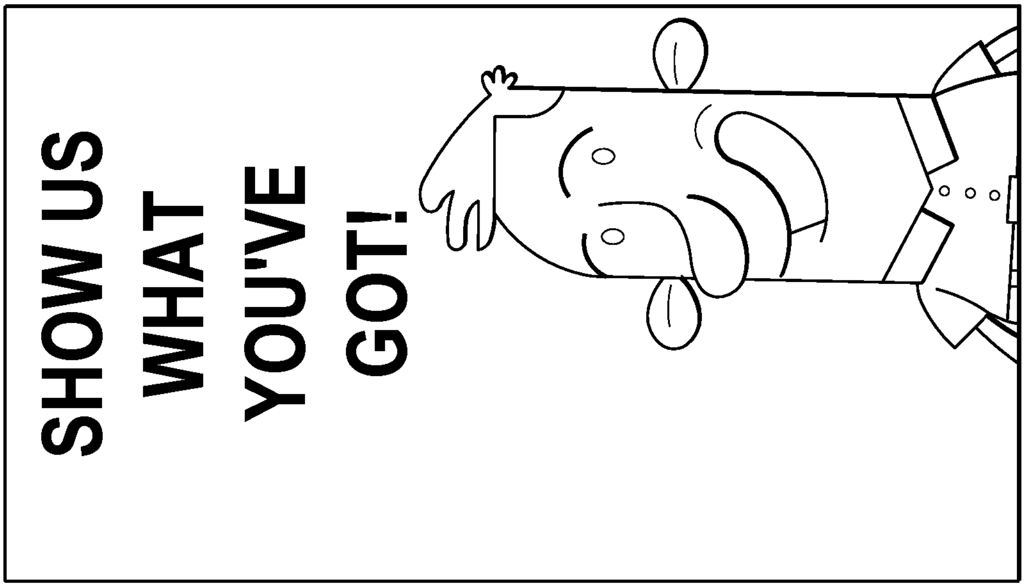
Figure 20B:
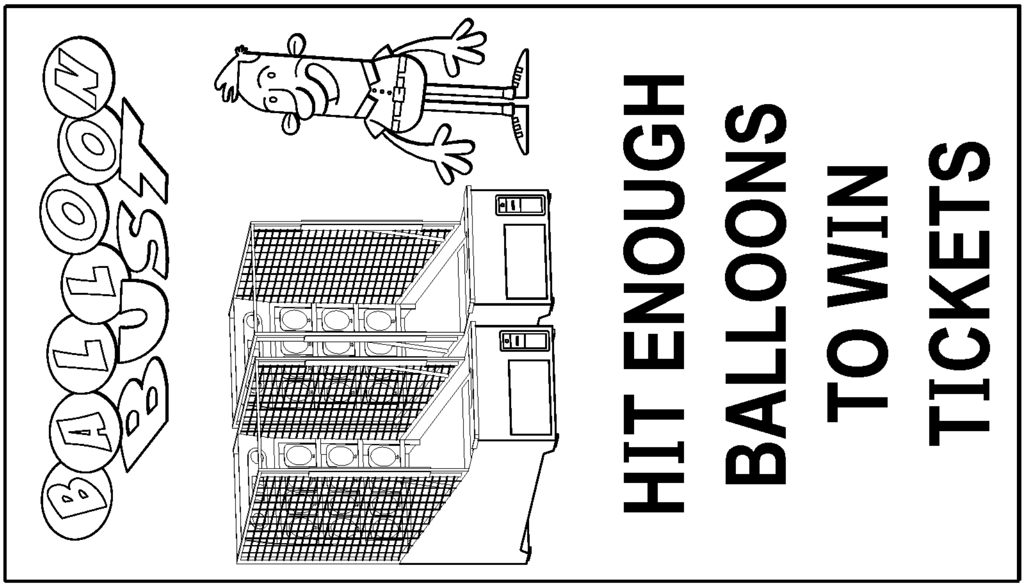
FIGS. 20A-20B are frames taken from an instructional video.
Figure 20A:
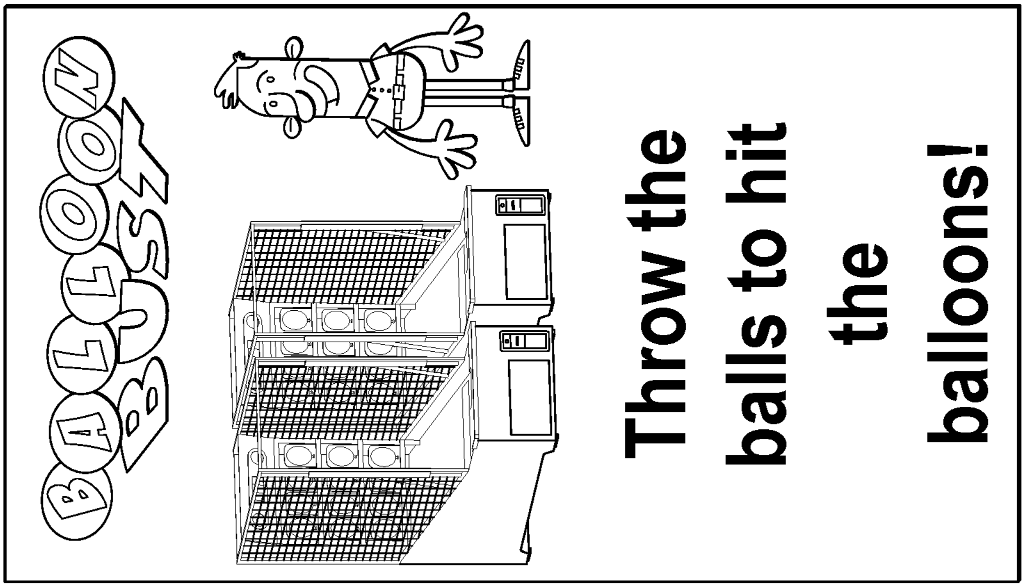

Referring to FIG. 18, a second way in which the VA device may be configured to gather information is through a direct operative connection to the game machine 100. More specifically, a control unit of the VA device may be connected to a control unit of the game machine 100, or to a component of the game machine 100, via data transmission cabling or through a suitable configuration of wireless communication modules (i.e., transmitters and receivers that establish wireless communications channels). The VA device may use this information to determine an appropriate media file to play. It is contemplated that a direct operative connection may be utilized either in addition to, or as an alternative for, the sensors shown in FIG. 17.

FIG. 18 shows an embodiment where a direct operative connection is an alternative for a payment-received sensor and the end-of-game sensor. Rather than include these sensors, the control unit of this device instead receives data from the payment device and the control unit of the game machine 100 to determine when payment has been received and when a gameplay session has ended.

The control unit of a VA device may include program instructions that, when executed, cause the VA device to play a media file upon the occurrence of a predetermined event or change in condition.

In one example, the VA device may receive information from a motion sensor indicating that a player has approached the counter section of the game machine 100. The control unit of the VA device may then execute program instructions that cause the VA device to play a multimedia file of a virtual attendant greeting the player and inviting the player to play the game machine 100 (i.e., through speaker 140 and/or on display screen 130).

In another example, the VA device may receive information from a payment-received sensor incorporated near the payment device of the game machine 100, or alternatively from the payment device itself, indicating that a game token has been inserted into the payment device. The control unit of the VA device may then execute program instructions that cause the VA device to play a multimedia file of a virtual attendant explaining gameplay rules and instructions.

In another example, the VA device may receive information from an end-of-game sensor incorporated with the machine, or alternatively from the game machine control unit, indicating that a gameplay session has ended. The control unit of the VA device 50 may then execute program instructions that cause the VA device to play a multimedia file of a virtual attendant announcing that the game has ended, announcing the score, and may invite the player to play again.

Figure 25:
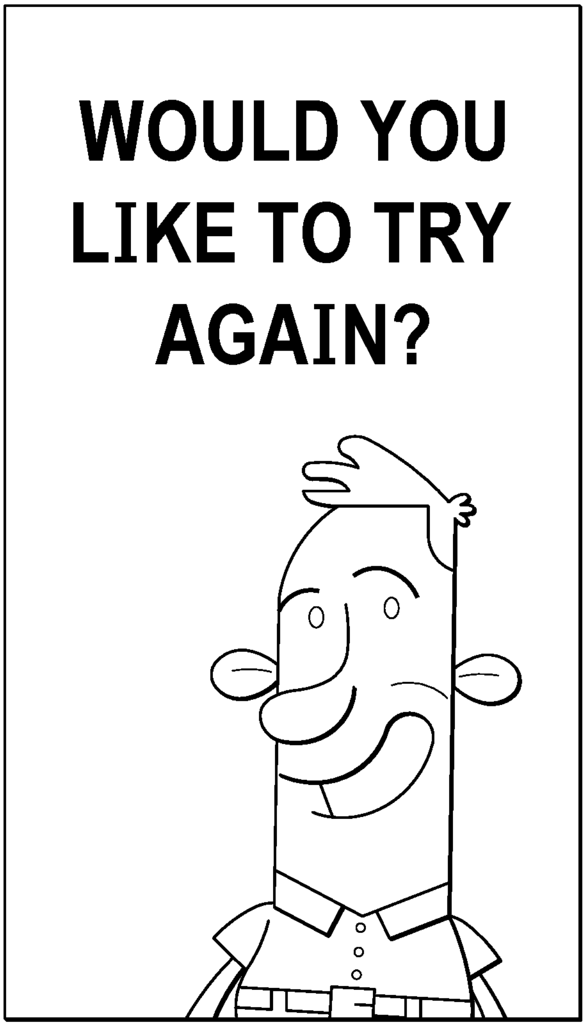
FIG. 25 is a frame taken from a second beckoning video.

Shown in FIGS. 19-25 are a variety of frames taken from several videos which may be displayed on the VA device. FIGS. 19A-19D show beckoning video for encouraging people to approach and play the game (sometimes referred to as a "barker"). FIGS. 20A-20B show an instructional video for teaching people how to play the game. FIG. 21 shows a payment acknowledgement video. FIGS. 22A-22C show a countdown video. FIGS. 23A-23B show a victory video. FIGS. 24A-23B shows a defeat video. FIG. 25 shows a second beckoning video for encouraging players to play the game again. In practice, these video may be displayed in response to a qualifying event (e.g., the presence or approach of a player near the VA device) or a stage of gameplay—i.e., a "trigger". By doing so, the VA device may foster a sense of interaction with the player throughout the gameplay experience, further negating the need for a human attendant. Additionally or alternatively, the VA device may further include a control panel with push-able buttons each assigned to a video (such as the videos listed above) whereby a person may manually push a button to select a video to display on the VA device.

The VA device may execute program instructions that cause the VA device to play a multimedia file on the display of practically any activity or function that a live attendant would perform as part of a live attendant's job of managing a game machine and the play of the game. Game Controller may start play functions, sequence play functions through a game play session, and stop/end play functions. A Payment Subsystem in association with the Controller may track payment received from a player to initiate a game play session and may communicate to the VA device to display that a certain payment amount was received and that the game is starting. A Rewards Subsystem may track player game performance (e.g., via points scored during a game session, or via elapsed time to complete a game objective, or via counts of targets struck, or via player to player comparison of game results, etc.) and reward a player by automatically activating dispensing of redeemable tickets or other indicia of success, and may prompt the display at the VA device to show the reward or points or credits amount. A Scoring Subsystem may be electronically connected to the game and the VA device to automatically track player performance during a game play session and to prompt the display to show an image of the score during a game session and/or after a game session is concluded. A Display Communications Module may include hardware and/or software for the VA device to communicate with the Game Controller and its various modules. In a further embodiment, artificial intelligence software in conjunction with computer processor(s) may be used with the VA device controller to enhance its attendant functions as it learns from repeated player encounters. As just one example of many, timing of announcements by the VA device may vary upon how long it routinely takes for players to perform aspects of a game play session.

Although the embodiments of the game system shown in the present disclosure each feature a single VA device with a single game machine, it is contemplated that different arrangements may be utilized. For example, it is contemplated that a game system may include multiple game machine with a single VA device, or multiple VA devices with a single game machine, or multiple VA devices with multiple game machines. Variations such as these will not result in a departure from the scope of the present disclosure.

Figure 26:
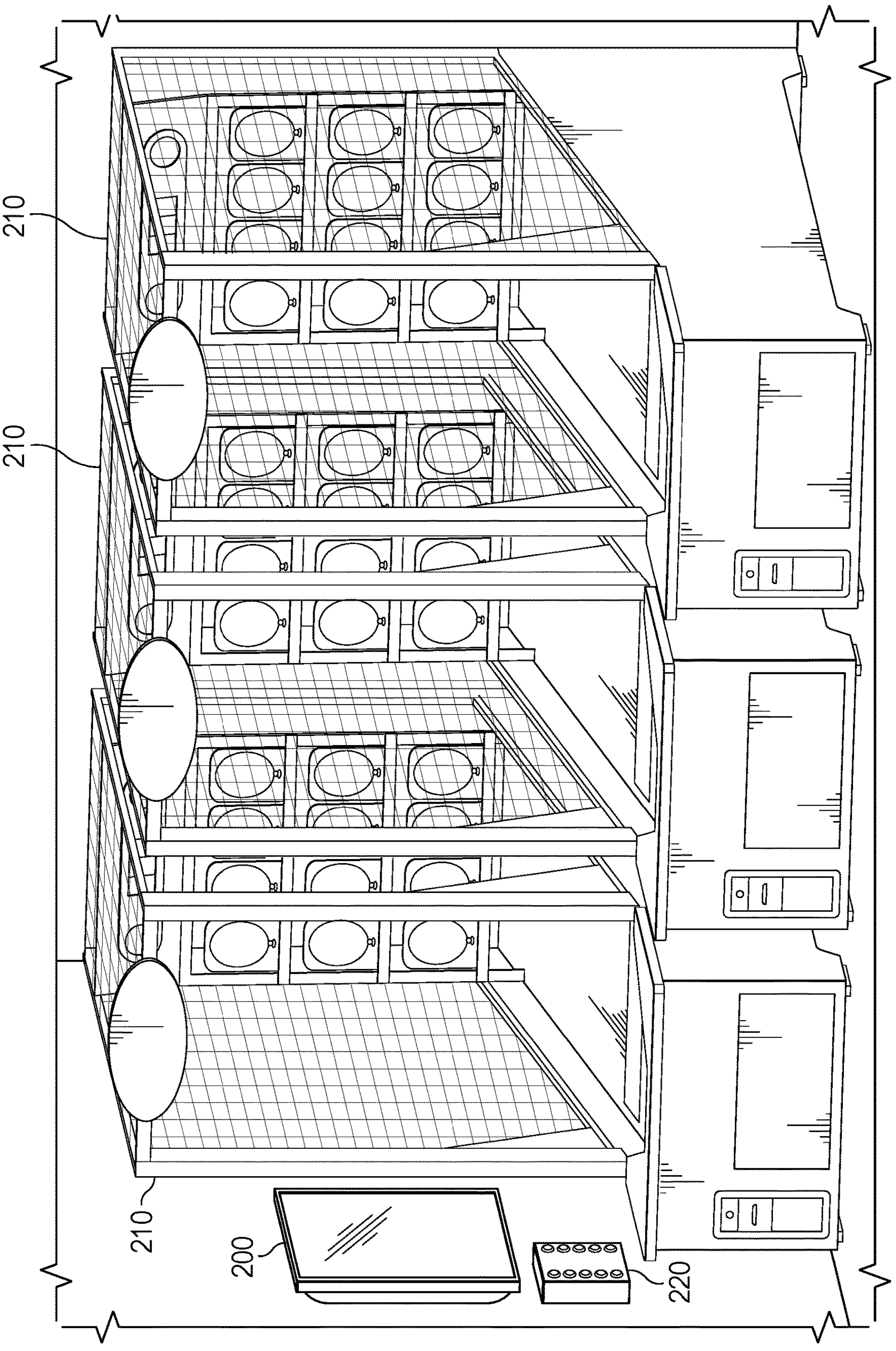
FIG. 26 is a second embodiment of the game system.
Figure 27:
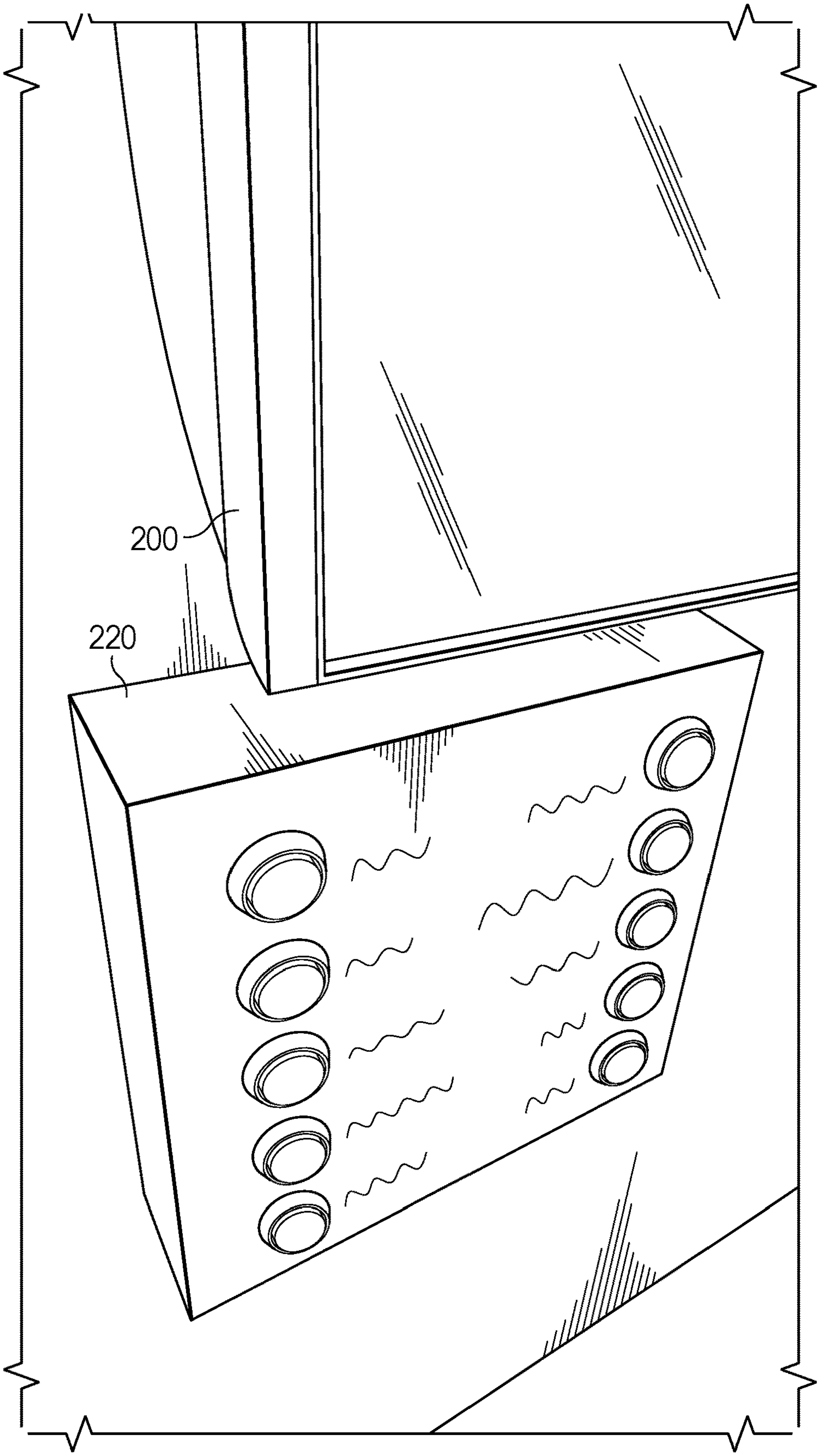
FIG. 27 is a close-up view of the control panel of the embodiment of FIG. 26.

Referring to FIGS. 26-27, in some embodiments of the game system the VA device or components thereof may be integrated with a game machine or with several game machines. In such embodiments, the game system may comprise a display screen 200 without a housing that is free to be mounted or otherwise placed near a game machine 210. Further, in such embodiments, the game system may also comprise video controller provided within, on, or near the game machine 210 that communicates with the main logic board of the game machine which will trigger the playing of videos on the display screen 200 based on certain events (e.g., people passing by, players submitting payment, players winning, players not winning, people standing near the game machine, etc.). Preferably, in such embodiments, the game system may further include a series of lidar sensors that detect the distance a person is from the game machine 210, thereby allowing the main logic board of the game machine 210 to read the lidar sensor to determine how near/far the person is from the game machine 210 and trigger a video to be played on the display screen 200 based on how far the person is (e.g., 5 ft away, 20 ft away, etc.). The lidar sensors may be provided on or near the game machine 210. Additionally or alternatively, a control panel 220 with push-able buttons each assigned to a video may be provided such that a person may manually push a button to select a video to play on the display screen 200.

Embodiments of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A game system comprising:
- a game machine configured to enable a gameplay session, the gameplay session having a start and an end;
- a display screen;
- a database of audio/video media files adapted to play on the display screen; and
- a control unit operatively connected to the display screen, the game machine, and the database, wherein the control unit is configured to;
  - retrieve information from the game machine about a status of a gameplay session, said status comprising at least one of: whether the gameplay session is ready to start, whether the gameplay session is in progress, and whether the gameplay session has ended;
  - retrieve an appropriate one of said media files from the database based on the status of the gameplay session; and
  - play the media file on the display screen.

2. The game system of claim 1, further comprising at least one sensor configured to detect the presence of a person near the game machine, wherein the control unit is configured to play a media file on the display screen in response to the sensor detecting the presence of a person.

3. The game system of claim 2, wherein the at least one sensor comprises a lidar sensor.

4. The game system of claim 1, wherein the control unit is configured to play a media file on the display screen in response to the occurrence of a stage of a gameplay session or an action taken by a player.

5. The game system of claim 1, wherein:
- the game system further comprises a control panel that comprises at least one button;
- each button of the control panel is associated with a media file in the database; and
- upon a button of the control panel being pressed, the control unit is configured to play the media file associated with the pressed button on the display screen.

6. The virtual attendant device of claim 1, wherein:
- the electronic game machine comprises a payment device and a logic board;
- at least one of the payment device and the logic board is configured to transmit information about payment received to the control unit; and
- the control unit is configured to retrieve an appropriate media file from the database based on the information received and play that media file on the display screen.

7. The game system of claim 1, wherein:
- the database of media files comprises a media file associated with the end of a gameplay session; and
- the control unit is configured to play the media file associated with the end of a gameplay session on the display screen when it retrieves information from the game machine indicating that a gameplay session is nearing its end or has already ended.

8. The game system of claim 7, wherein:
- the media file associated with the end of a gameplay session comprises at least one of:
  - a countdown timer;
  - a game win indication;
  - a game lose indication; and
  - an invitation to play again.

9. The game system of claim 2, wherein:
- the at least one sensor comprises a sensor configured to determine the distance between the game machine and a person in the vicinity of the game machine;
- the database comprises a media file that is associated with a predetermined distance; and
- the control unit is configured to play said media file when the sensor detects a person at the predetermined distance.

10. The game system of claim 2, wherein:
- the database of media files comprises a media file of gameplay rules and instructions; and
- the control unit is configured to play the media file of gameplay rules and instructions on the display screen when a sensor detects a player.

* * * * *